US006956687B2

(12) United States Patent
Moon et al.

(10) Patent No.: US 6,956,687 B2
(45) Date of Patent: Oct. 18, 2005

(54) OPTICAL BLOCKING FILTER HAVING AN ARRAY OF MICRO-MIRRORS

(75) Inventors: John A. Moon, Wallingford, CT (US); Alan D. Kersey, Glastonbury, CT (US); James S. Sirkis, Wallingford, CT (US); James R. Dunphy, Glastonbury, CT (US); Joseph Pinto, Wallingford, CT (US); Paul Szczepanek, Middletown, CT (US); Michael A. Davis, Glastonbury, CT (US); Martin A. Putnam, Cheshire, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/327,695

(22) Filed: Dec. 19, 2002

(65) Prior Publication Data

US 2003/0184843 A1 Oct. 2, 2003

Related U.S. Application Data

(63) Continuation-in-part of application No. 10/120,617, filed on Apr. 11, 2002, now abandoned, which is a continuation-in-part of application No. 10/115,647, filed on Apr. 3, 2002.
(60) Provisional application No. 60/365,741, filed on Mar. 18, 2002, provisional application No. 60/365,461, filed on Mar. 18, 2002, provisional application No. 60/332,319, filed on Nov. 16, 2001, provisional application No. 60/332,318, filed on Nov. 16, 2001, provisional application No. 60/311,002, filed on Aug. 8, 2001, provisional application No. 60/283,197, filed on Apr. 11, 2001, and provisional application No. 60/281,079, filed on Apr. 3, 2001.

(51) Int. Cl.⁷ .......................... G02B 26/00; G02B 26/08
(52) U.S. Cl. ................ 359/223; 359/224; 359/290; 359/291; 385/16; 385/39; 398/45; 398/83; 398/85

(58) Field of Search .................. 359/571–573, 359/900, 290–292, 395, 297, 298, 301–302, 315, 318, 320, 223, 850, 872, 224, 308, 618, 629, 634, 639; 398/45, 49, 51, 54, 83, 85, 87–88, 79, 81; 385/33, 31, 39, 1–3, 15–18, 11, 24

(56) References Cited

U.S. PATENT DOCUMENTS

| 4,626,066 A | 12/1986 | Levinson | 385/22 |
| 4,799,795 A | 1/1989 | Fateley | 356/310 |
| 4,819,084 A | 4/1989 | Bark | 358/296 |

(Continued)

OTHER PUBLICATIONS

Texas Instruments, U.S. Appl. No. 60/250,520, filed Nov. 30, 2000, Ref. from Publication No. 2002/0081070, Tew.

(Continued)

*Primary Examiner*—Hung Xuan Dang
*Assistant Examiner*—Joseph Martinez

(57) ABSTRACT

A reconfigurable optical blocking filter deletes a desired optical channel(s) from an optical WDM input signal, and includes a spatial light modulator having a micro-mirror device with a two-dimensional array of micro-mirrors that tilt between first and second positions in a "digital" fashion in response to a control signal provided by a controller in accordance with a switching algorithm and an input command. A collimators, diffraction grating, and Fourier lens, collectively collimate, separate and focus the optical input channels onto the array of micro-mirrors. The optical channel is focused on the micro-mirrors onto a plurality of micro-mirrors of the micro-mirror device, which effectively pixelates the optical channels. To delete an input channel of the optical input signal, micro-mirrors associated with each desired input channel are tilted to reflect the desired input channel away from the return path.

51 Claims, 30 Drawing Sheets

U.S. PATENT DOCUMENTS

| | | | |
|---|---|---|---|
| 5,121,239 A | 6/1992 | Post | 352/272 |
| 5,158,420 A | 10/1992 | Weyer | 414/694 |
| 5,166,766 A | 11/1992 | Grudkowski et al. | 257/15 |
| 5,504,575 A | 4/1996 | Stafford | 356/330 |
| 5,699,462 A | 12/1997 | Fouquet et al. | 385/18 |
| 5,729,386 A | 3/1998 | Hwang | 359/618 |
| 5,774,604 A | 6/1998 | McDonald | 385/18 |
| 5,915,063 A | 6/1999 | Colbourne et al. | 385/140 |
| 6,128,077 A | 10/2000 | Jovin et al. | 356/310 |
| 6,160,928 A | 12/2000 | Schroeder | 385/18 |
| 6,204,946 B1 * | 3/2001 | Aksyuk et al. | 398/9 |
| 6,222,954 B1 * | 4/2001 | Riza | 385/18 |
| 6,246,818 B1 | 6/2001 | Fukushima | 385/47 |
| 6,263,127 B1 | 7/2001 | Dragone et al. | 385/24 |
| 6,434,291 B1 | 8/2002 | Kessler et al. | 385/24 |
| 6,459,484 B1 | 10/2002 | Yokoi | 356/318 |
| 6,525,863 B1 | 2/2003 | Riza | 359/290 |
| 6,636,654 B2 * | 10/2003 | McGuire, Jr. | 385/17 |
| 6,647,164 B1 * | 11/2003 | Weaver et al. | 385/16 |
| 6,661,948 B2 * | 12/2003 | Wilde | 385/24 |
| 2001/0046350 A1 | 11/2001 | Tedesco | |
| 2002/0009257 A1 | 1/2002 | Bouevitch et al. | |
| 2002/0081070 A1 | 6/2002 | Tew | |

OTHER PUBLICATIONS

S. Yuan et al., "General Formula for Coupling–loss Characterization of Single–Mode Fiber Collimators by Use of Gradient–Index Rod Lenses, Applied Optics", vol. 38. No. 15, May 20, 1999, pp. 3214–3222.

N. Riza, "Reconfigurable Optical Wireless", IEEE Lasers and Electro–Optics Society 1999 Annual Meeting, vol. 1, pp. 70–71.

N. Riza et al., "Digitally Controlled Fault–Tolerant Multi-wavelength Programmable Fiber–Optic Attenuator Using a Two–Dimensional Digital Micromirror Device", 1999 Optical Society of America.

N. Riza et al., "Multiwavelength Three Dimensional 2×2 Fiber–Optic Switch Structure Using Small Tilt Micro–Mirrors", SPIE vol. 3749, pps 470–471.

G. Love, "Liquid–crystal Phase Modulator For Unpolarized Light", Applied Optics, vol. 32, No. 13, May 1, 1994, pps 2222–2223.

N. Riza et al., "Synchronous Amplitude and Time Control for an Optimum Dynamic Range Variable Photonic Delay Line", Applied Optics, vol. 38, No. 11, Apr. 10, 1999, 2309–2318.

N. Riza et al., "Robust Packaging of Photonic RF Modules Using Ultra–Thin Adaptive Optical Interconnect Devices", SPIE vol. 3160, pps. 170–176.

N. Riza et al., "Demonstration of a Liquid–crystal adaptive alignment tweeker for high–speed Infrared Band Fiber–Fed Free–space Systems", Opt. Eng. 37(6), Jun. 1998, 1876–1880.

M. D. Johnson et al., "Two–axis Micromirror Scanner", SPIE vol. 3787, Jul. 1999, pps. 88–95.

H. Laor et al., "Performance of a 576×576 Optical Cross Connect", National Fiber Optic Engineers Conference, Sep. 26–30, 1999, pps. 276–281.

* cited by examiner

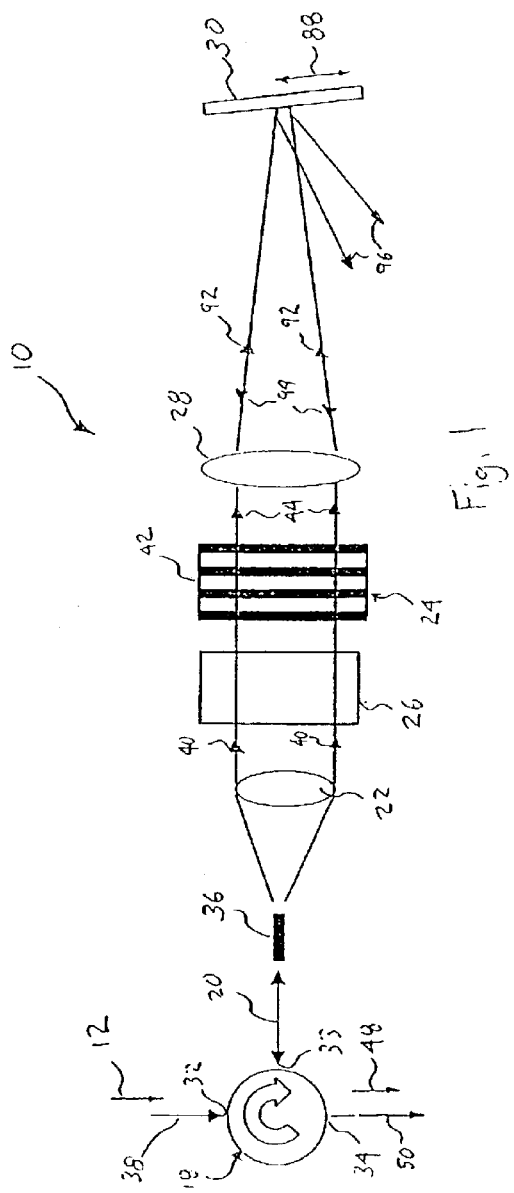
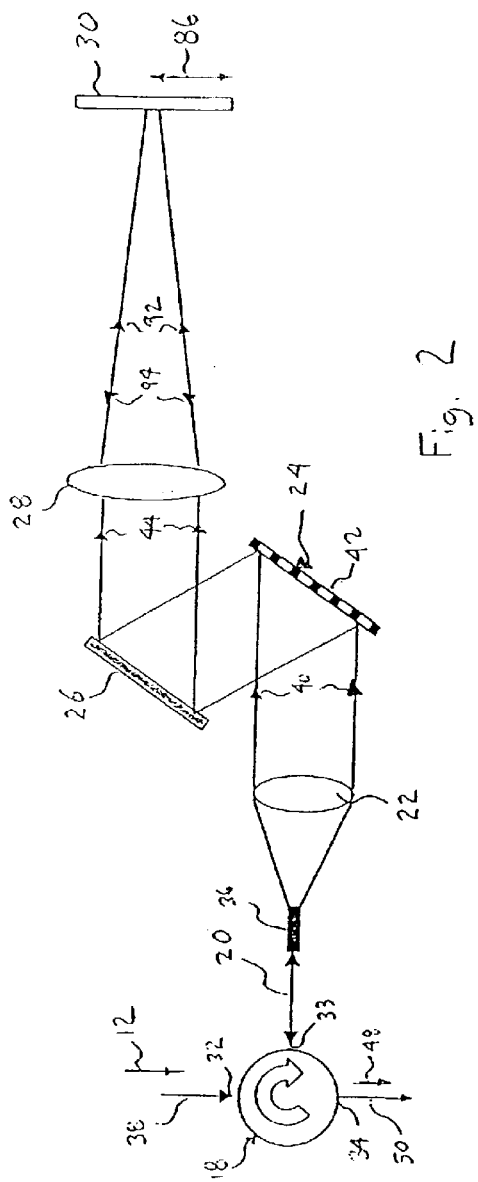
Fig. 1
Fig. 2

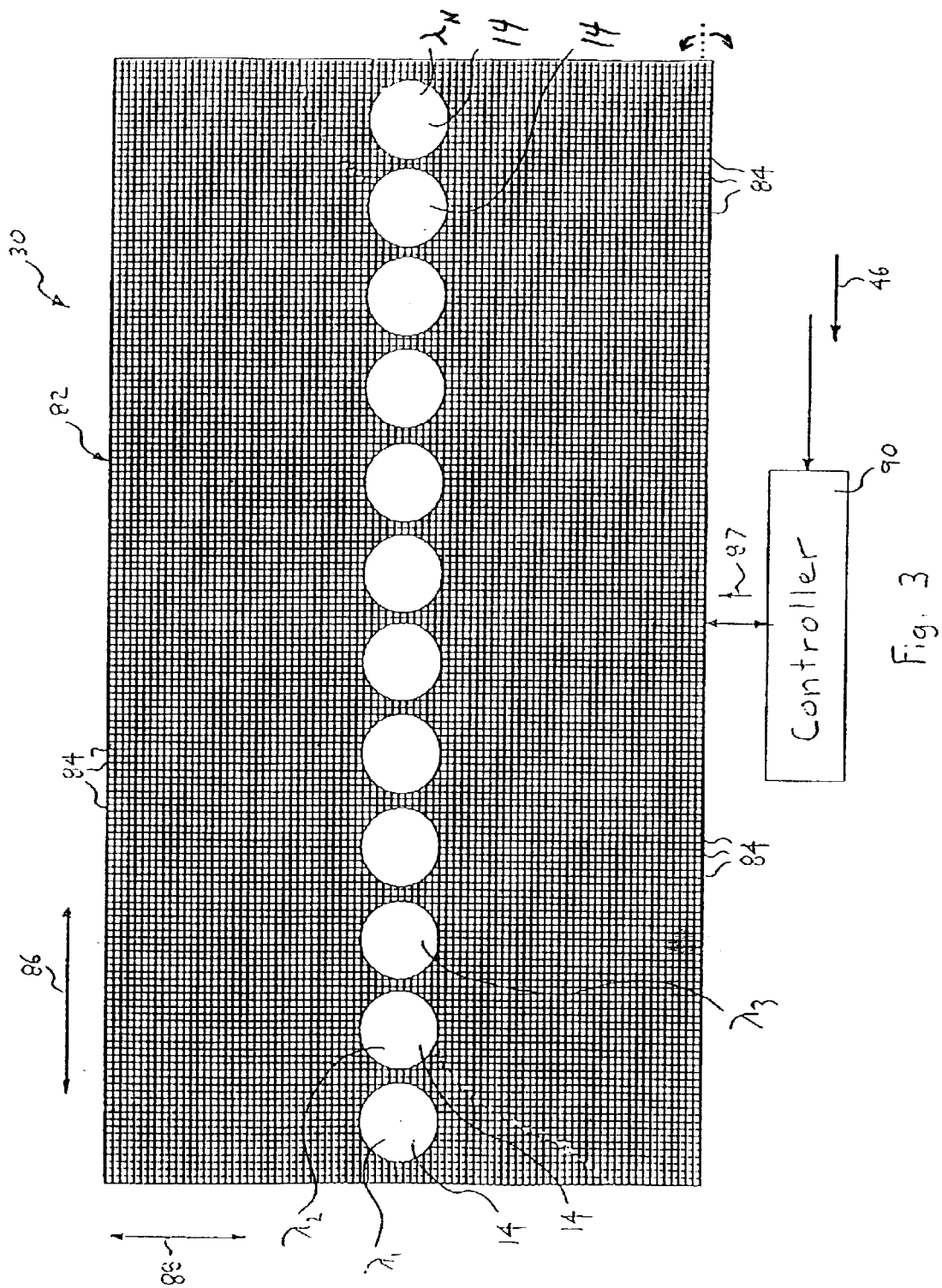

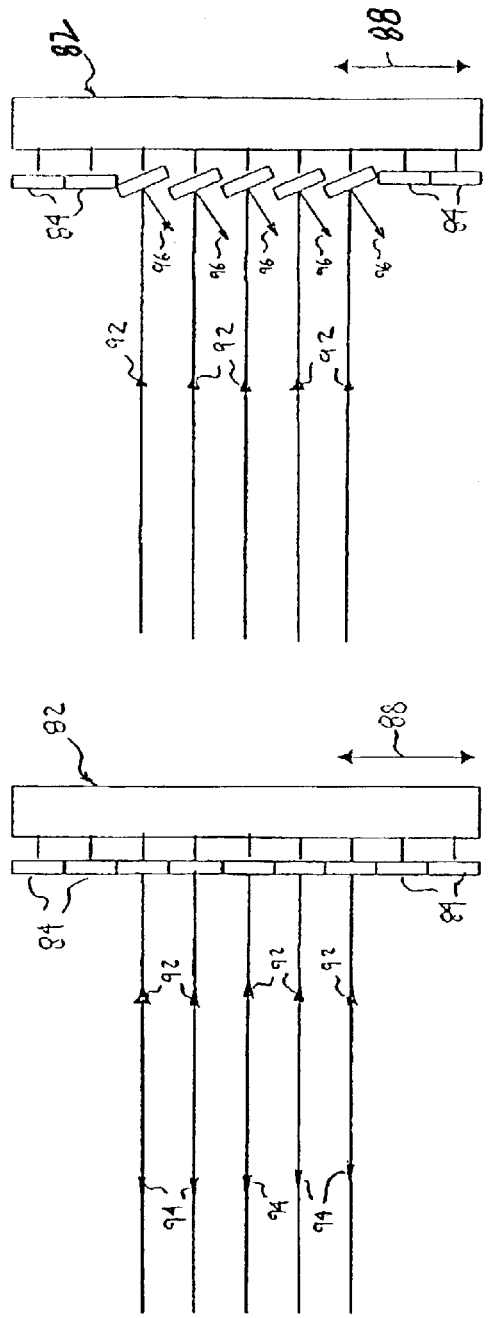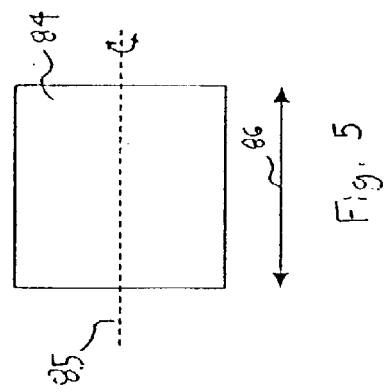

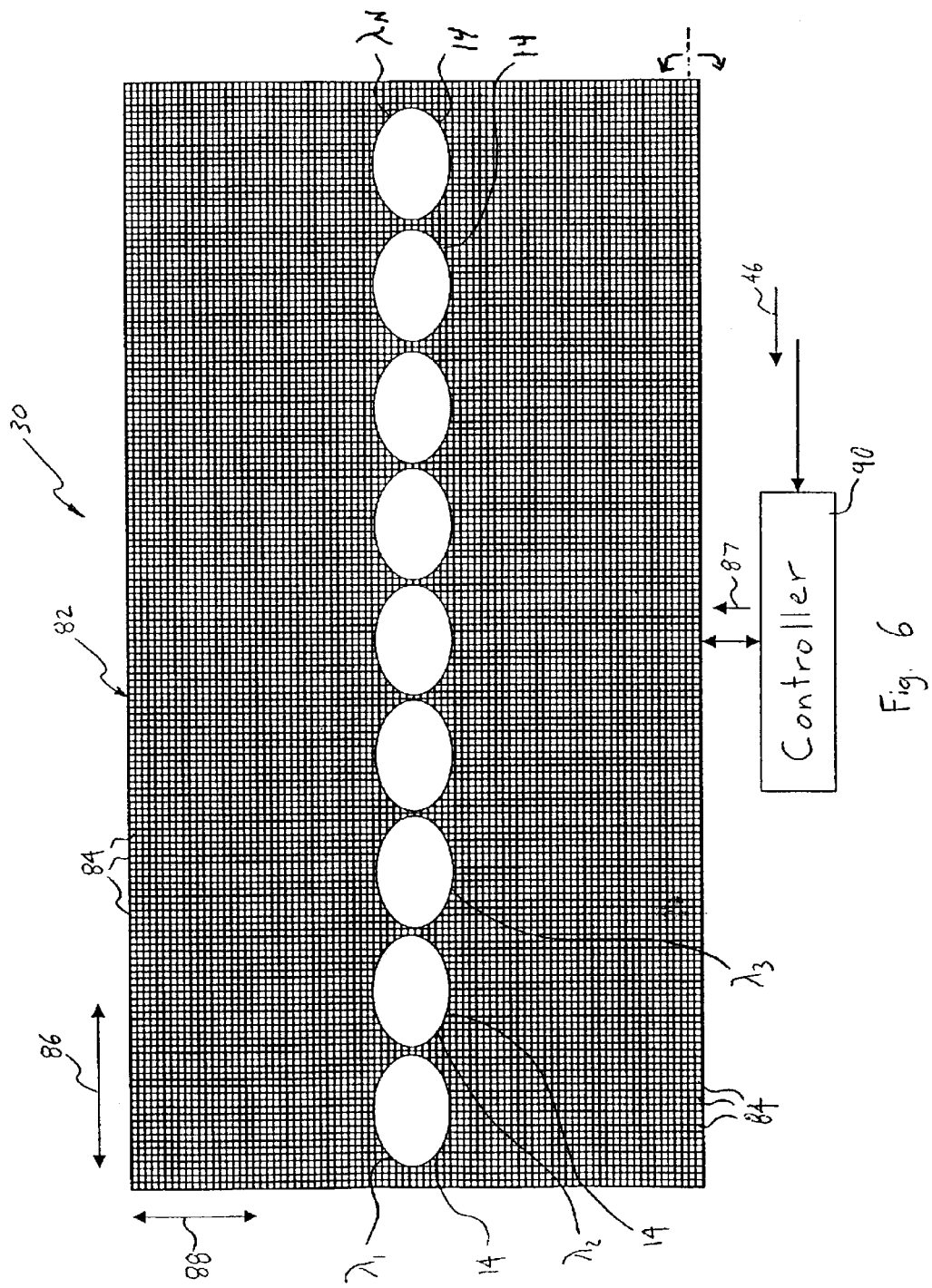

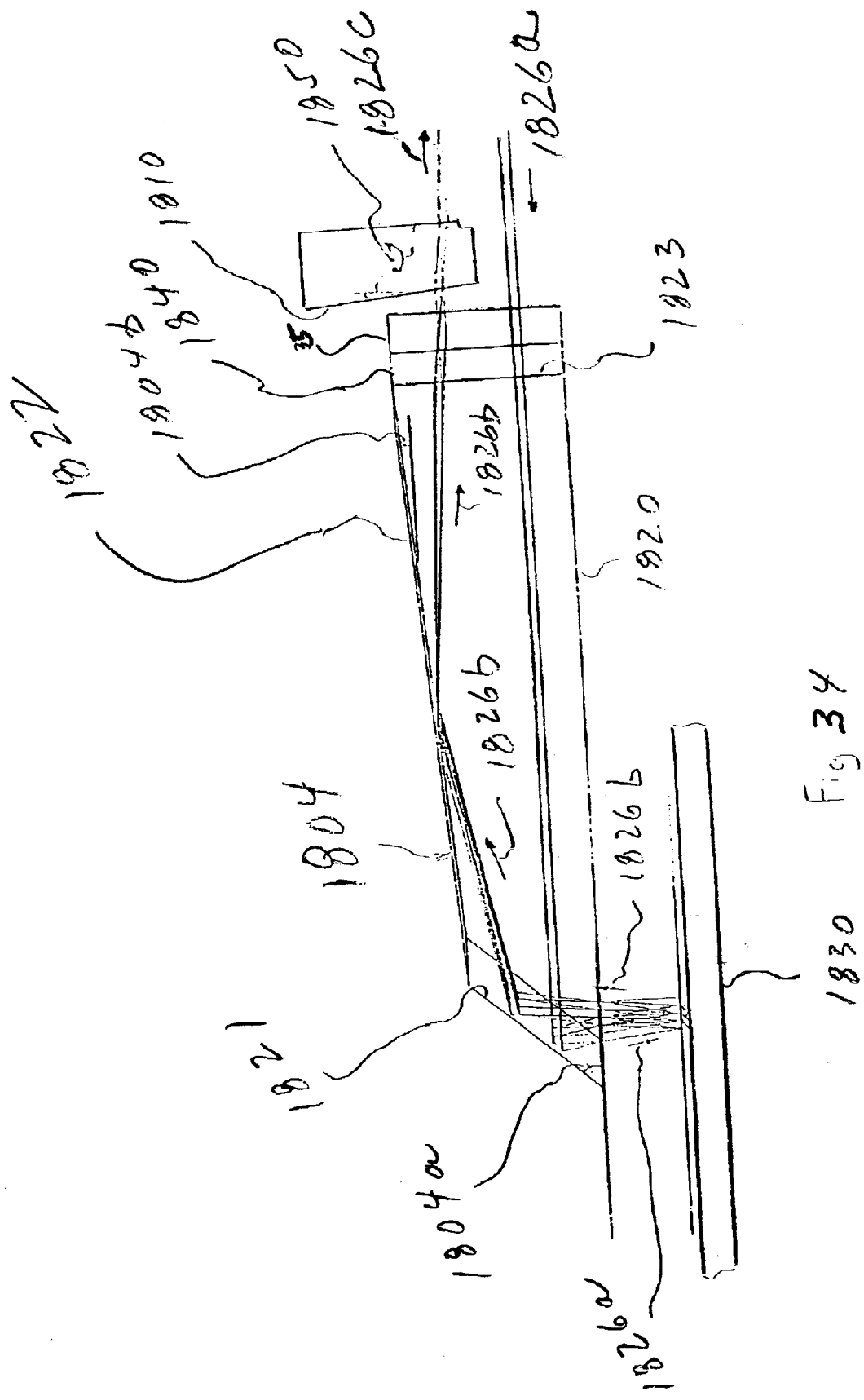

US 6,956,687 B2

OPTICAL BLOCKING FILTER HAVING AN ARRAY OF MICRO-MIRRORS

CROSS REFERENCE TO RELATED APPLICATIONS

This patent claims the benefit to U.S. Provisional Patent Application Ser. No. 60/332,318, filed Nov. 16, 2001, and is a continuation-in-part of U.S. patent application Ser. No. 10/115,647, filed Apr. 3, 2002, which claims the benefit of U.S. Provisional Patent Application Ser. No. 60/281,079, filed Apr. 3, 2001; U.S. Provisional Patent Application Ser. No. 60/311,002, filed Aug. 8, 2001; U.S. Provisional Patent Application Ser. No. 60/332,319, filed Nov. 16, 2001; U.S. Provisional Patent Application Ser. No. 60/365,741, filed Mar. 18, 2002; and U.S. Provisional Patent Application Ser. No. 60/365,461, filed Mar. 18, 2002; and is a continuation-in-part of U.S. patent application Ser. No. 10/120,617, filed Apr. 11, 2002, now abandoned, which claims the benefit of U.S. Provisional Patent Application Ser. No. 60/283,197, all of which are incorporated herein by reference in their entirety.

BACKGROUND OF THE INVENTION

1. Technical Field

The present invention relates to a tunable optical filter, and more particularly to a dynamic optical filter, such as a reconfigurable blocking filter having a multi-dimensional array of micromirrors to selectively delete individual channels within a wavelength division multiplexed (WDM) optical signal.

2. Description of Related Art

MEMS micro-mirrors have been widely explored and used for optical switching and attenuation applications. The most commonly used application is for optical cross-connect switching. In most cases, individual micro-mirror elements are used to 'steer' a beam (i.e., an optical channel) to a switched port or to deflect the beam to provide attenuation on a channel-by-channel basis. Each system is designed for a particular 'wavelength plan' —e.g. "X" number of channels at a spacing "Y", and therefore each system is not 'scalable' to other wavelength plans.

Further, dynamic gain equalization (or "flattening") is a critical technology for deployment of next-generation optical network systems. Dynamic gain equalizing filters (DGEF's) function by adding varying amounts of attenuation at different spectral locations in the signal spectrum of optical fiber communication systems. For instance, a DGEF may be designed to operate in the "C-band" (~1530–1565 nm) of the communication spectrum that is capable of selectively attenuating spectrally concatenated "bands" of some preselected spectral width (e.g., 3 nm). The total number of bands within the DGEF is determined by the width of an individual band.

In the networking systems, it is often necessary to route different channels (i.e., wavelengths) between one fiber and another using a reconfigurable optical add/drop multiplexer (ROADM) and/or an optical cross-connect device. Many technologies can be used to accomplish this purpose, such as Bragg gratings or other wavelength selective filters.

One disadvantage of Bragg grating technology is that it requires many discrete gratings and/or switches, which makes a 40 or 80 channel device quite expensive. A better alternative would be to use techniques well known in spectroscopy to spatially separate different wavelengths or channels using bulk diffraction grating technology. For example, each channel of an ROADM is provided to a different location on a generic micro-electro-mechanical system (MEMS) device. The MEMs device is composed of a series of tilting mirrors, where each discrete channel hits near the center of a respective mirror and does not hit the edges. In other words, one optical channel reflects off a single respective mirror.

One issue with the above optical MEMs device is that it is not "channel plan independent". In other words, each MEMs device is limited to the channel spacing (or channel plan) originally provide. Another concern is that if the absolute value of a channel wavelength changes, a respective optical signal may begin to hit an edge of a corresponding mirror leading to large diffraction losses. Further, since each channel is aligned to an individual mirror, the device must be carefully adjusted during manufacturing and kept in alignment when operated through its full temperature range in the field.

It would be advantageous to provide an optical blocking filter that mitigates the above problems by using an array of micro-mirrors.

SUMMARY OF THE INVENTION

An object of the present invention is to provide a pixilated optical blocking filter having a spatial light modulator that includes a micro-mirror device having an array of micro-mirrors, wherein a plurality of micro-mirrors, actuated in concert, eliminates a selected channel, a specified selection of channels, or selected bands of channels by deflecting the light beam constituting the optical channels away from the return path. The present invention effectively meets the requirements of a blocking filter by eliminating all (attenuation greater than −45 Db) the power of the selected channel or channels while transmitting the remaining channels virtually unaffected (minimum insertion loss and flat, within a fraction of a Db, pass bands). The pixilated filter configuration advantageously permits the optical filter to be reconfigurable by changing a filtering algorithm that drives the micromirrors to effect both the channel position, channel bandwidth, and band pass profile without changing any hardware or configuration.

In accordance with an embodiment of the present invention, a blocking filter includes a first collimator that collimates an optical input signal. The optical input signal comprises a plurality of optical input channels, each of which are centered at a central wavelength. A first light dispersion element substantially separates the optical input channels of the collimated optical input signal. A spatial light modulator reflects each separated optical input channel along a respective first optical path or second optical path in response to a control signal. The spatial light modulator includes a micro-mirror device that has an array of micro-mirrors selectively disposable between a first and a second position in response to the control signal. Each separated optical input channel is incident on a respective group of micro-mirrors. Each respective separated optical input channel reflects along the respective first optical path when the micro-mirrors are disposed in the first position, or along the respective second optical path when the micro-mirrors are disposed in the second position. A controller generates the control signal in accordance with a switching algorithm.

BRIEF DESCRIPTION OF THE DRAWINGS

The drawing includes the following Figures:

FIG. 1 is a top plan view of an optical blocking filter including a spatial light modulator in accordance with the present invention;

FIG. 2 is a side elevational view of the optical blocking filter of FIG. 1;

FIG. 3 is a front view of a spatial light modulator of the optical blocking filter of FIG. 1 having a micro-mirror device, wherein the optical channels of a WDM input signal are distinctly projected onto the micro-mirror device, in accordance with the present invention;

FIG. 4a is a pictorial cross-sectional view of the micro-mirror device of FIG. 3 showing a partial row of micro-mirrors, when the micro-mirrors are disposed in a first position perpendicular to the light beam of the input signal in accordance with the present invention;

FIG. 4b is a pictorial cross-sectional view of the micro-mirror device of FIG. 3 showing a partial row of micro-mirrors, when the micro-mirrors are disposed in a second position non-orthogonal to the light beam of the input signal in accordance with the present invention;

FIG. 5 is a front view of a micro-mirror of the micro-mirror device of FIG. 3 in accordance with the present invention;

FIG. 6 is a front view of a spatial light modulator of the optical blocking filter of FIG. 1 having a micro-mirror device, wherein the optical channels of a WDM input signal are distinctly projected onto the micro-mirror device, in accordance with the present invention;

FIG. 34 is side elevational view of a portion of the optical channel filter of FIG. 33.

DETAILED DESCRIPTION OF THE INVENTION

Figure 7:
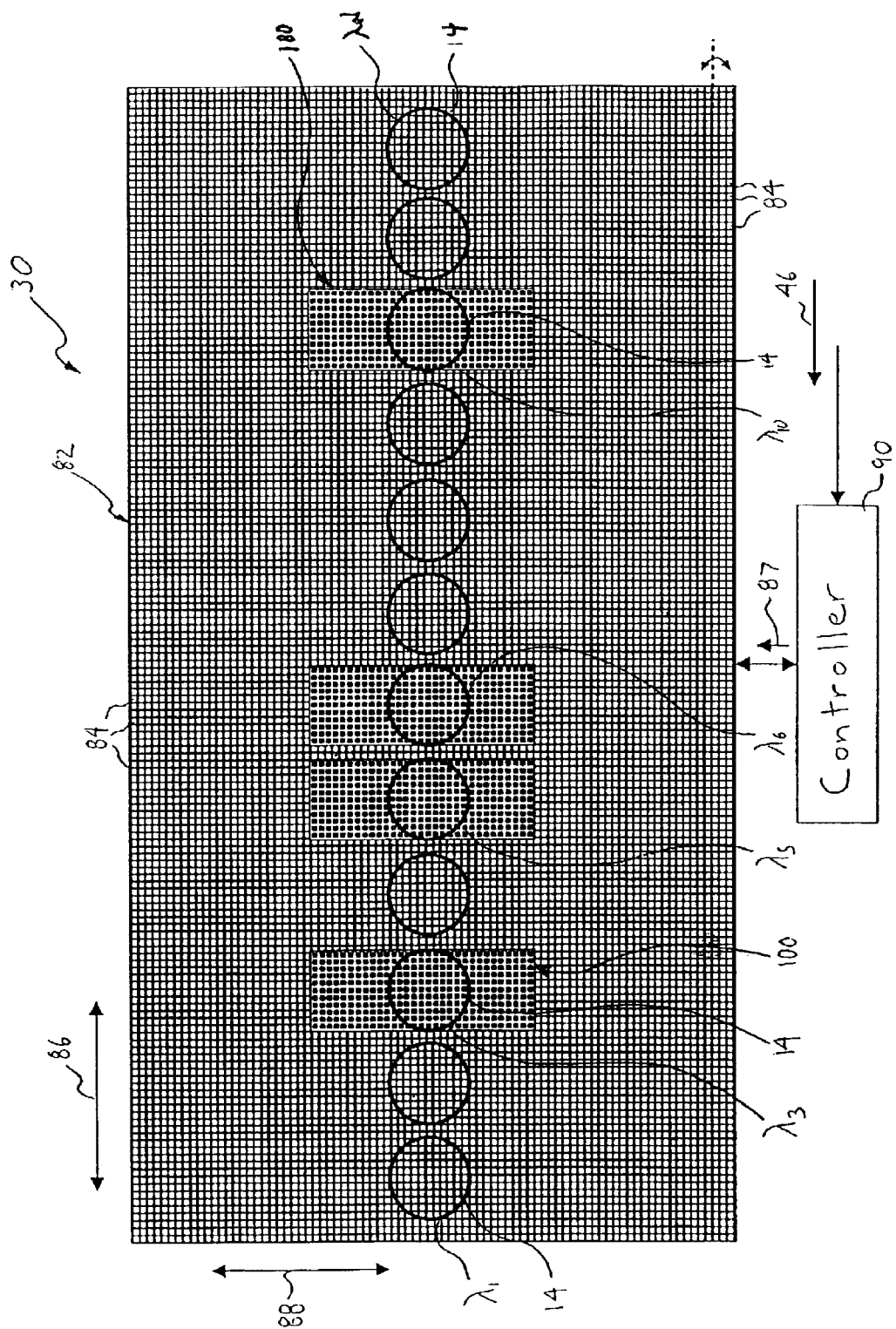
FIG. 7 is a front view of a spatial light modulator of the optical blocking filter of FIG. 3, wherein groups of micro-mirrors are tilted to select/filter an optical channel from the WDM input signal, in accordance with the present invention.

Referring to FIGS. 1–3, an optical blocking filter, generally shown as 10, deletes at least one desired optical channel 14 of light (i.e., a wavelength band) from an optical WDM input signal 12. Each of the optical channels 14 (see FIG. 3) of the input signal 12 is centered at a respective channel wavelength ($\lambda_1, \lambda_2, \lambda_3, \ldots, \lambda_N$)

FIG. 1 is a top plan view of the blocking filter 10. To better understand the blocking filter 10 of FIG. 1, a side elevational view of the blocking filter is illustrated in FIG. 2. As shown in FIG. 2, the optics of the blocking filter 10 is disposed in two tiers or horizontal planes. Specifically, the blocking filter includes a three-port circulator 18, an optical fiber or pigtail 20, a collimator 22, a light dispersive element 24, a mirror 26, and a bulk lens 28 for directing light to and from a spatial light modulator 30. As shown, the pigtail 20, the collimator 22 and the light dispersive element 24 are disposed in a first tier or horizontal plane. The mirror 26, bulk lens 28 and the spatial light modulator 30 are disposed in the second tier or second horizontal plane which is substantially parallel to the first horizontal plane.

Referring to FIGS. 1 and 2, the three-port circulator 18 directs light from a first port 32 to a second port 33 and from the second port to a third port 34. The optical fiber or pigtail 20 is optically connected to the second port of the circulator 18. A capillary tube 36, which may be formed of glass, is attached to one end of the pigtail 20 such as by epoxying or collapsing the tube onto the pigtail. The circulator 18 at the first port 32 receives the WDM input signal 12 tapped from an optical network (not shown) via optical fiber 38, and directs the input light to the pigtail 20. The input signal 12 exits the pigtail (into free space) and passes through the collimator 22, which collimates the input signal. The collimator 22 may be an aspherical lens, an achromatic lens, a doublet, a GRIN lens, a laser diode doublet or similar collimating lens. The collimated input signal 40 is incident on the light dispersion element 24 (e.g., a diffraction grating or a prism), which separates spatially the optical channels of the collimated input signal 40 by diffracting or dispersing the light from (or through) the light dispersion element.

In one embodiment, the diffraction grating 24 comprises a blank of polished fused silica or glass with a reflective coating (such as evaporated gold or aluminum), wherein a plurality of grooves 42 (or lines) are etched, ruled or otherwise formed in the coating. The diffractive grating 24 has a predetermined number of lines, such as 600 lines/mm, 850 lines/mm and 1200 lines/mm. The resolution of the blocking filter improves as the number of lines/mm in the grating increases. The grating 24 may be similar to those manufactured by Thermo RGL, part number 3325FS-660 and by Optometrics, part number 3-9601. Alternatively, the diffraction grating may be formed using holographic techniques, as is well known in the art. Further, the light dispersion element may include a prism or optical splitter to disperse the light as the light passes therethrough, or a prism having a reflective surface or coating on its backside to reflect the dispersed light.

As best shown in FIG. 2, the diffraction grating 24 directs the separated light 44 to the mirror 26 disposed in the second tier. The mirror 26 reflects the separated light 44 to the bulk lens 28 (e.g., a Fourier lens), which focuses the separated light onto the spatial light modulator 30, as shown in FIG. 3. In response to a switching algorithm and input command 46, the spatial light modulator 30 reflects at least one optical input channel (i.e., the deleted input channel(s)) away from the bulk lens 28 as indicated by arrows 96, and reflects the remaining optical signals (i.e., the through channels) back through the same optical path to the pigtail 20 as indicated by arrows 94, as best shown in FIG. 1. The through channels propagate from the second port 33 to the third port 34 of the optical circulator 18 to provide an output signal 48 from optical fiber 50.

As shown in FIG. 3, the spatial light modulator 30 comprises a micro-mirror device 82 having a two-dimensional array of micro-mirrors 84, which cover a surface of the micro-mirror device. The micro-mirrors 84 are generally square and typically 14–20 $\mu$m wide with 1 $\mu$m spaces between them. FIG. 4a illustrates a partial row of micro-mirrors 84 of the micro-mirror device 82, when the micro-mirrors are disposed in a first position to reflect the light back along the return path 94 and provide the through channel(s) 14 to the optical fiber 50. FIG. 4b illustrates a partial row of micro-mirrors 84 when the micro-mirrors are disposed in a second position, and therefore delete the corresponding input channels 14 along optical path 96, as will be described in greater detail hereinafter. The micro-mirrors may operate in a "digital" fashion. In other words, as the micro-mirrors either lie flat in a first position, as shown in FIG. 4a, or be tilted, flipped or rotated to a second position, as shown in FIG. 4b.

As described herein before, the positions of the mirrors, either flat or tilted, are described relative to the optical path 92 wherein "flat" refers to the mirror surface positioned orthogonal to the optical path, either coplanar in the first position or parallel as will be more fully described hereinafter. The micro-mirrors flip about an axis 85 parallel to the spectral axis 86, as shown in FIGS. 3 and 5. One will appreciate, however, that the micromirrors may flip about any axis, such as parallel to the spatial axis 88 or at a 45 degrees angle to the spatial axis.

Referring to FIG. 3, the micro-mirrors 84 are individually flipped between the first position and the second position in response to a control signal 87 provided by a controller 90 in accordance with a switching algorithm and an input command 46 from the processing unit 54. The switching algorithm may provide a bit (or pixel) map indicative of the state (flat or tilted) of each of the micro-mirrors 84 of the array to return and/or drop the desired optical channel(s) 14 to provide the output signal 48 at optical fiber 50 (see FIG. 1), and thus requiring a bit map for each configuration of channels to be dropped. Alternatively, each group of mirrors 84, which reflect a respective optical channel 14, may be individually controlled by flipping the group of micro-mirrors to direct the channel along a desired optical path (i.e., through or delete).

As shown in FIGS. 1 and 4a, the micro-mirror device 82 is oriented to reflect the focused light 92 of the input signal 12 back through the bulk lens 28 to the pigtail 20, as indicated by arrows 94, to provide the output signal 48, when the micro-mirrors 84 are disposed in the first position. As shown in FIGS. 1 and 4b, the focused light 92 reflects away from the bulk lens 28, as indicated by arrows 96. This "digital" mode of operation of the micro-mirrors advantageously eliminates the need for any type of feedback control for each of the micro-mirrors. The micro-mirrors are either "on" or "off" (i.e., first position or second position), respectively, and therefore, can be controlled by simple binary digital logic circuits.

FIG. 3 further illustrates the outline of the optical channels 14 of the optical input signal 12, which are dispersed off the diffraction grating 24 and focused by the bulk lens 28, onto the array of micro-mirrors 84 of the micro-mirror device 82. Each optical channel 14 is distinctly separated from other channels across the spectrum and has a generally circular cross-section, such that the input channels do not substantially overlap spatially when focused onto the spatial light modulator 30. The optical channels have a circular cross-section to project as much of the beam as possible over a multitude of micro-mirrors 84, while keeping the optical channels separated by a predetermined spacing. One will appreciate though that the diffraction grating 24 and bulk lens 28 may be designed to reflect and focus any input channel or group of input channels with any desired cross-sectional geometry, such as elliptical, rectangular, square, polygonal, etc in any desired orientation on the micro-mirror device. For example, FIG. 6 illustrates the outline of the optical channels 14 dispersed onto the micromirror device 82, wherein the channels have an elliptical cross-section. Regardless of the cross-sectional geometry selected, the cross-sectional area of the channels 14 should illuminate a plurality of micro-mirrors 84, which effectively pixelates the optical channels. In an exemplary embodiment, the cross sectional area of the input channels 14 is generally circular in shape, whereby the width of the optical channel beam spans over approximately 11 micro-mirrors.

One will appreciate that while the spacing between the channels are predetermined, the spacing between may be non-uniform. For example, one grouping of channels may be spaced to correspond to a 100 Ghz spacing, and another group of channels may be spaced to correspond to a 50 Ghz spacing.

Advantageously, the present invention provides a blocking filter that is channel plan independent. In other words, the blocking filter may be used for optical system having different channel spacings (e.g., 25 Ghz, 50 Ghz and 100 Ghz) by simply modifying or switching the software without having to modify the hardware. Further, the blocking filters of the present invention enable their filter functions to be dynamically changed, for example by modifying the tilting patterns of the micromirror device to achieve the desired filter function. These modifications include varying the width, height and shape of the micromirror patterns. The present invention further contemplates blocking or deleting blocks of adjacent optical channels.

FIG. 7 is illustrative of the position of the micro-mirrors 84 of the micro-mirror device 82 for deleting the optical channels 14 at $\lambda_3$, $\lambda_5$, $\lambda_6$ and $\lambda_{10}$, for example. The outline of each channel 14 is shown to provide a reference to visually locate the group of tilted mirrors 100. As shown, the group of mirrors 100 of the optical channels at $\lambda_3$, $\lambda_5$, $\lambda_6$ and $\lambda_{10}$ are tilted away from the return path 94 to the second position, as indicated by the blackening of the micro-mirrors 84, and therefore deleted from the input channel 12. The group of tilted mirrors 100 provides a generally rectangular shape, but one will appreciate that any pattern or shape may be tilted to delete the desired input channels. In an exemplary embodiment, the groups of micro-mirrors 100 reflect substantially all the light of the input channels 14, at $\lambda_3$, $\lambda_5$, $\lambda_6$ and $\lambda_{10}$ away from the bulk lens 28 indicated by arrows 96 (see FIG. 1). The micro-mirrors 84 of the through input channels 14 at $\lambda_1$, $\lambda_2$, $\lambda_4$, $\lambda_7$–$\lambda_9$ and $\lambda_{11}$–$\lambda_N$ are flat (i.e., first position), as indicated by the white micro-mirrors, to reflect the light 92 back along the return path 94 to the first pigtail 20, as described hereinbefore.

Figure 8:
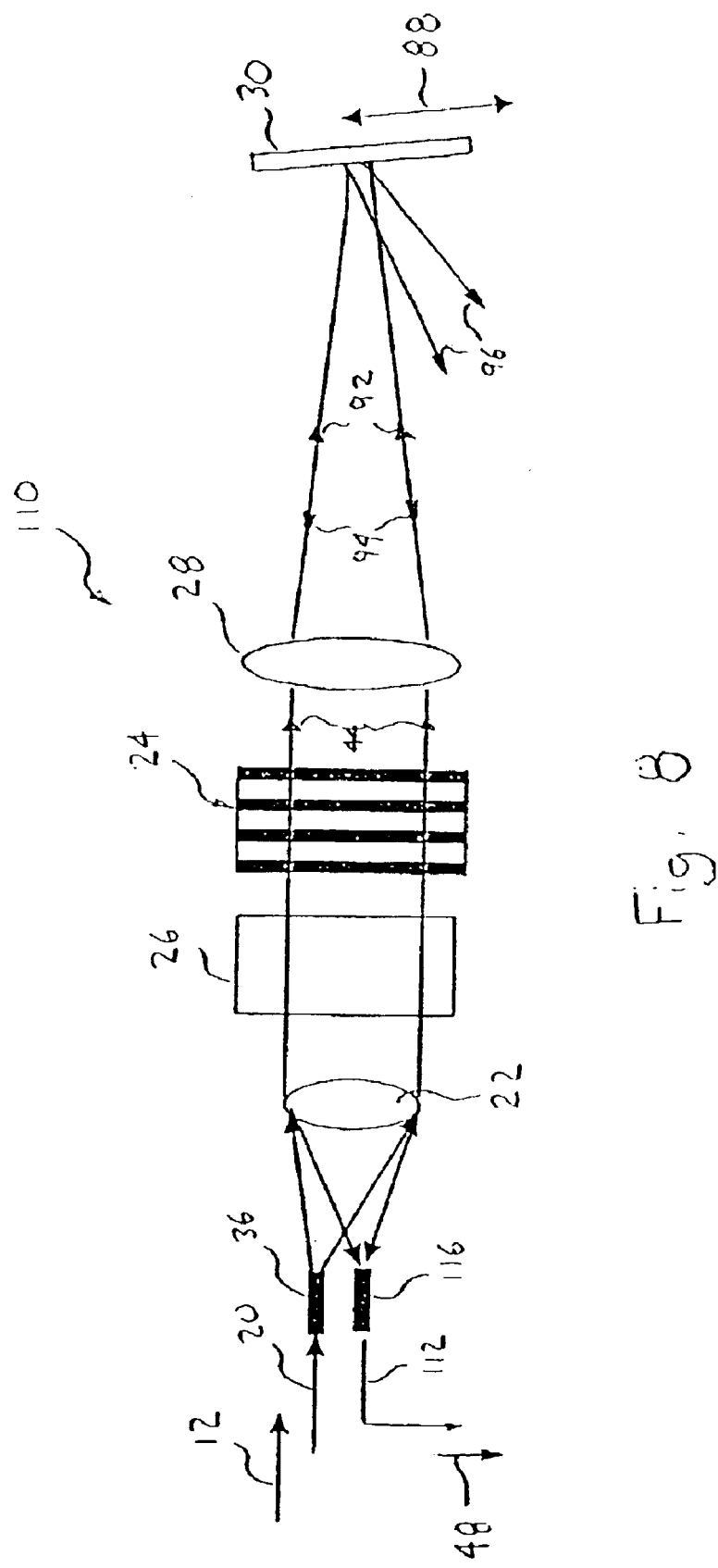
FIG. 8 is a top plan view of another embodiment of an optical blocking filter including a spatial light modulator, in accordance with the present invention.

In another exemplary embodiment, a blocking filter 110 is provided in FIG. 8 that is substantially similar to the blocking filter 10 of FIG. 1, and therefore, common components have the same reference numeral. The blocking filter 110 replaces the circulator 18 of FIG. 1 with a second pigtail 112. The second pigtail 112 has a glass capillary tube 116 attached to one end of the second pigtail. The second pigtail 112 receives the through input channels reflected from the micro-mirror device back along an optical return path. Specifically, the second pigtail 112 receives the through input channels 14 reflected back along the return optical path 94 from the spatial light modulator 30.

To accomplish these expected return paths, the spatial light modulator 30 cannot be an image plane of the first pigtail 20 along the spatial axis 88. These conditions can be established by ensuring that the lens system 22 and 28 be astigmatic. In particular, the lens 28 may be a cylindricalized lens with its cylindrical axis parallel to the spatial axis 88. By tilting the spatial light modulator 30, the return path can be displaced to focus at the second pigtail 112.

In another embodiment similar to the blocking filters 10, 110 of FIGS. 1, 2 and 8, the mirror 26 of each blocking filter 10, 110 may be eliminated with the bulk lens 28 and the spatial light modulator 30 repositioned to directly receive the light dispersed by the diffraction grating 24.

Figure 9:
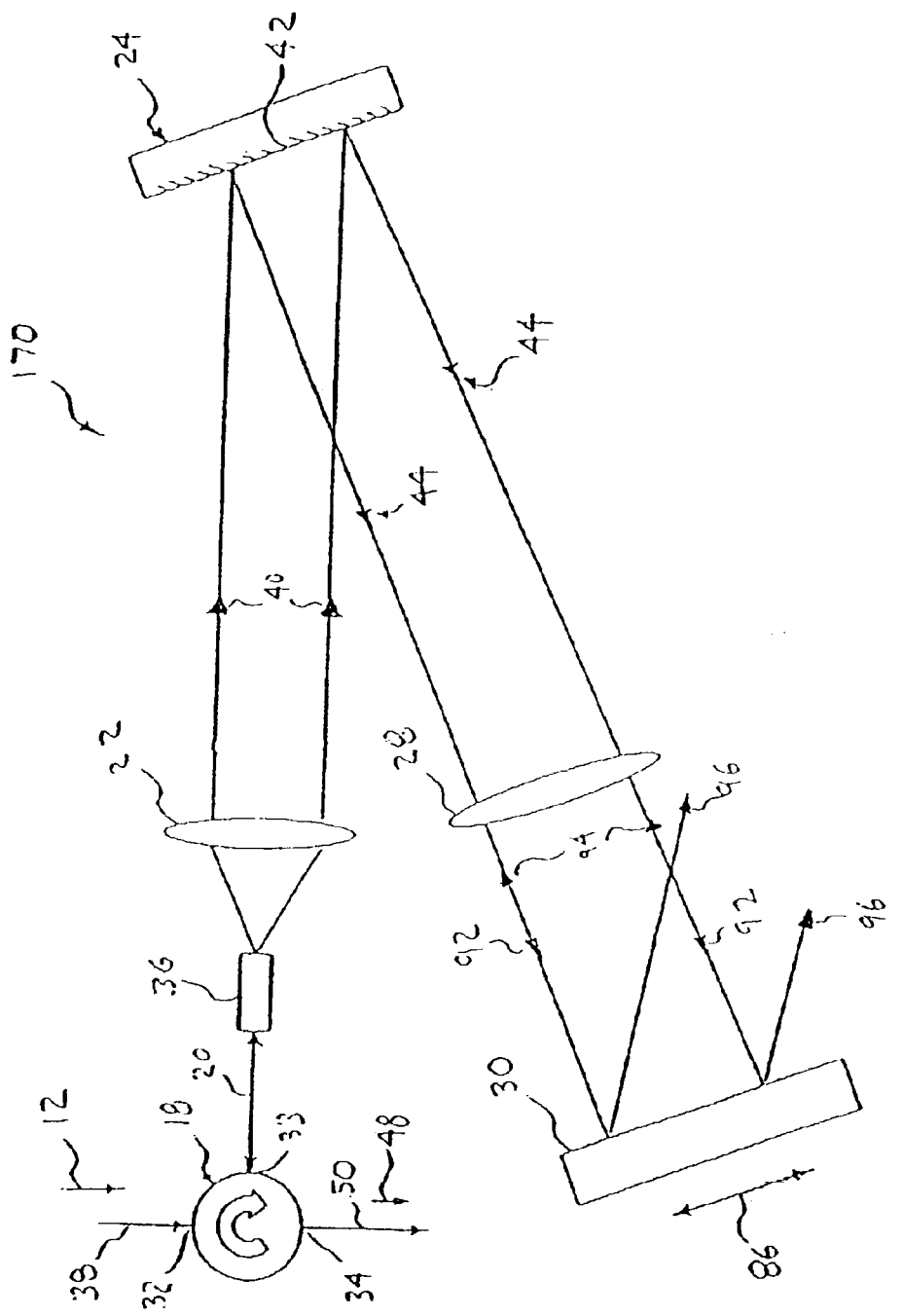
FIG. 9 is a top plan view of another embodiment of an optical blocking filter including a spatial light modulator, in accordance with the present invention.

FIG. 9 illustrates another embodiment of a blocking filter 170 in accordance with the present invention, which is similar to the blocking filter 10 of FIG. 1, and therefore similar components have the same reference numerals. The blocking filter 170 is substantially the same as the blocking filter 10 depicted in FIG. 1, except the optical components of the blocking filter 170 are disposed in one horizontal plane, rather than two tiers or planes, as shown in FIG. 2. Rather than using a mirror 26 (in FIGS. 1 and 2) to direct the dispersed light 44 to the bulk lens 28 and the spatial light modulator 30, the diffraction grating 24 is tilted to directly disperse the light onto the bulk lens 28 which focuses the light onto the spatial light modulator.

Figure 10:
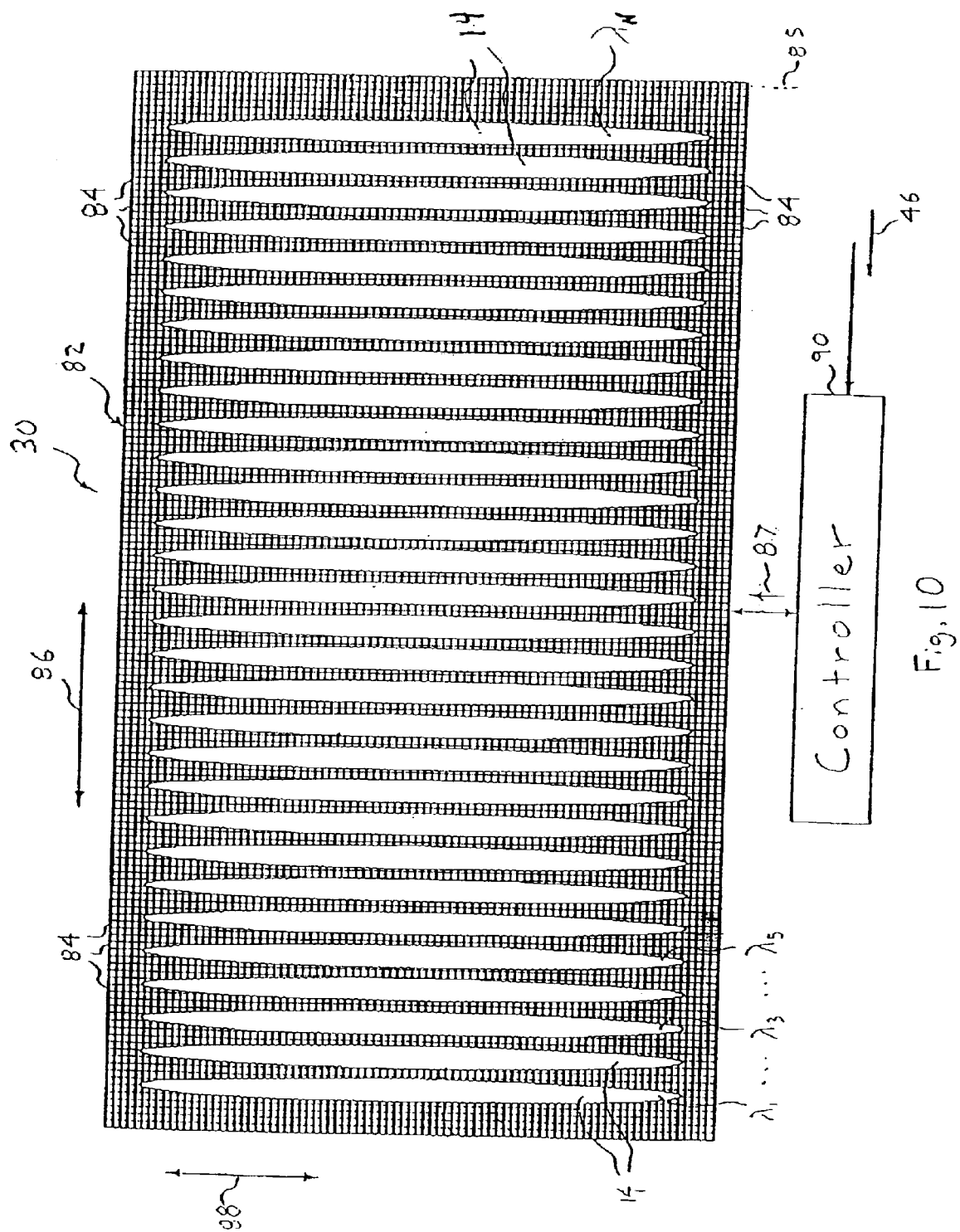
FIG. 10 is a front view of a spatial light modulator of the optical blocking filter of FIG. 9 having a micro-mirror device, wherein the optical channels of a WDM input signal are distinctly projected onto the micro-mirror device, in accordance with the present invention.

Functionally, the blocking filter 170 of FIG. 9 and blocking filter 10 of FIG. 1 are substantially the same. For illustrative purposes however, the collimator 22 and the bulk lens 28 of the blocking filter 170 may be astigmatic to provide dispersed optical channels 14 incident on the micromirror device 82 having a substantially elliptical cross-section, as shown in FIG. 10. Further, the diffraction grating is rotated approximately 90 degrees such that the spectral axis 86 of the optical channels is parallel to the horizontal plane, and the micro-mirror device 82 is similarly rotated approximately 90 degrees such that the spectral axis 86 of the optical channels 14 is perpendicular to the tilt axis 85 of the micro-mirrors 84.

Figure 11:
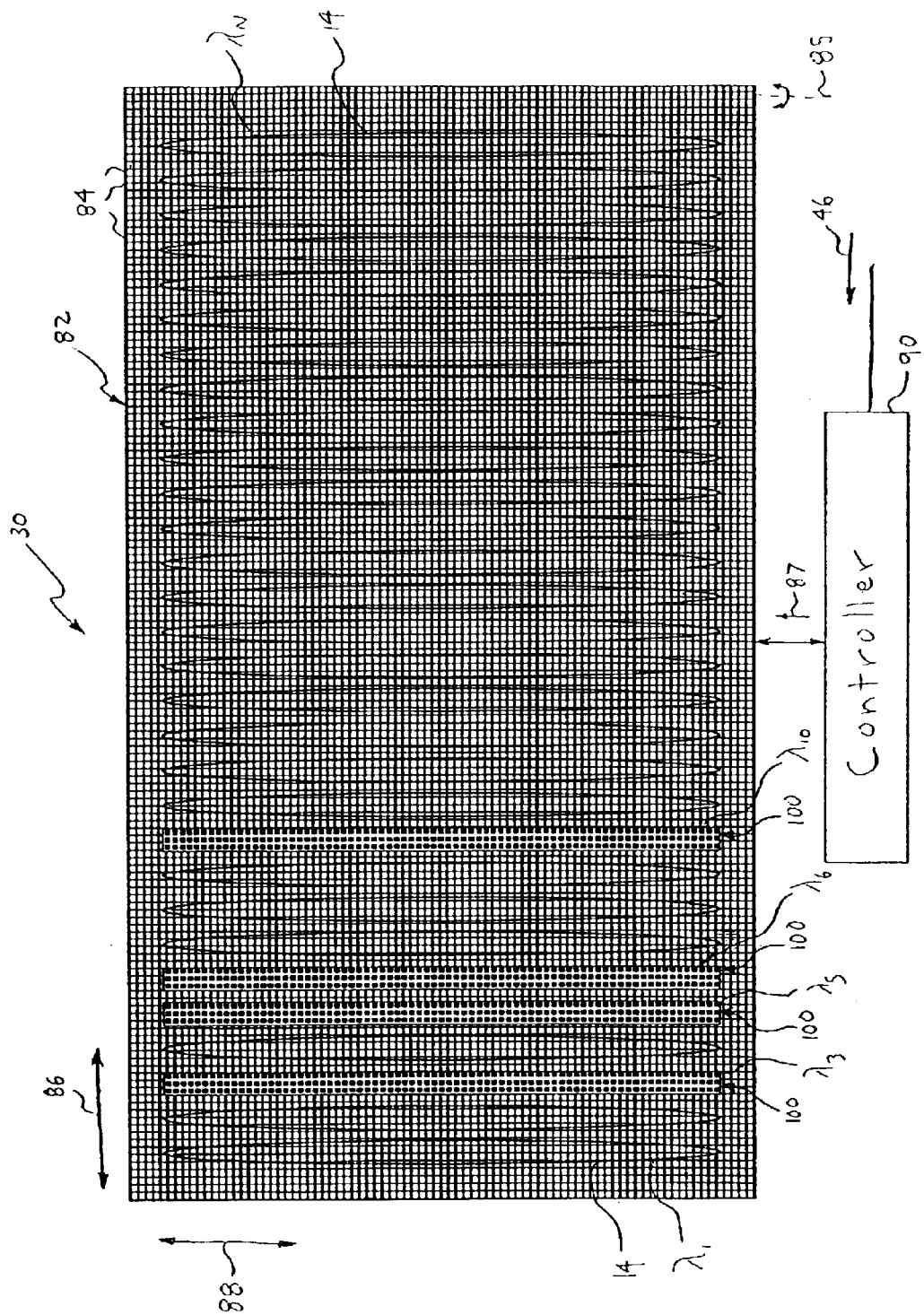
FIG. 11 is a front view of a spatial light modulator of the optical blocking filter of FIG. 9, wherein groups of micro-mirrors are tilted to select/filter an optical channel from the WDM input signal, in accordance with the present invention.

FIG. 11 is illustrative of the position of the micro-mirrors 84 of the micro-mirror device 82 for deleting the optical input channel 14 at $\lambda_3$, $\lambda_5$, $\lambda_6$ and $\lambda_{10}$, for example. The outline of each channel 14 is shown to provide a reference to visually locate the group of tilted mirrors 100. As shown, groups of mirrors 100 associated with the input channels at $\lambda_3$, $\lambda_5$, $\lambda_6$ and $\lambda_{10}$, are tilted away from the return path to the second position, as indicated by the blackening of the micro-mirrors 84. The groups of tilted micro-mirrors 100 provide a generally rectangular shape having sufficient dimensions to delete the respective channels. The micro-mirrors 84 of the selected channel 14 at $\lambda_1$, $\lambda_2$, $\lambda_6$, $\lambda_7$–$\lambda_9$, and $\lambda_{11}$–$\lambda_N$ are flat (i.e., first position), as indicated by the white micro-mirrors, to reflect the light back along the return path 94 to the pigtail 22, as described hereinbefore.

The micro-mirror device 82 of FIGS. 1–3 is similar to the Digital Micromirror Device™ (DMD™) manufactured by Texas Instruments and described in the white paper entitled "Digital Light Processing™ for High-Brightness, High-Resolution Applications", white paper entitled "Lifetime Estimates and Unique Failure Mechanisms of the Digital Micromirror Device (DMD)", and news release dated September 1994 entitled "Digital Micromirror Display Delivering On Promises of 'Brighter' Future for Imaging Applications", which are incorporated herein by reference.

Figure 12:
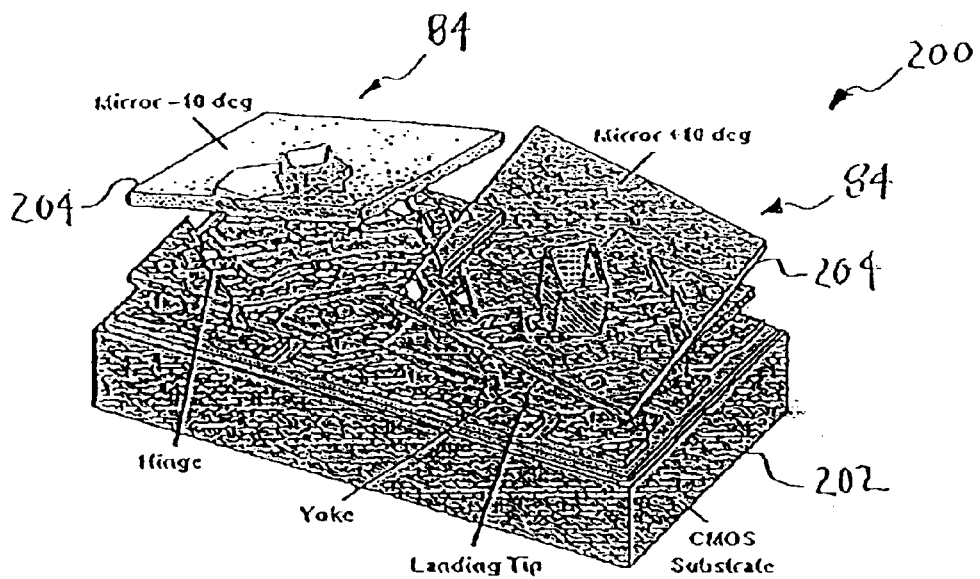
FIG. 12 is a perspective view of a portion of a known micro-mirror device.

FIG. 12 illustrates a pair of micro-mirrors 84 of a micro-mirror device 200 manufactured by Texas Instruments, namely a digital micro-mirror device (DMD™). The micro-mirror device 200 is monolithically fabricated by CMOS-like processes over a CMOS memory 202. Each micro-mirror 84 includes an aluminum mirror 204, 16 μm square, that can reflect light in one of two directions, depending on the state of the underlying memory cell 202. Rotation, flipping or tilting of the mirror 204 is accomplished through electrostatic attraction produced by voltage differences between the mirror and the underlying memory cell. With the memory cell 202 in the on (1) state, the mirror 204 rotates or tilts approximately +10 degrees. With the memory cell in the off (0) state, the mirror tilts approximately −10 degrees. As shown in FIG. 14, the micro-mirrors 84 flip about an axis 205.

Figure 14A:
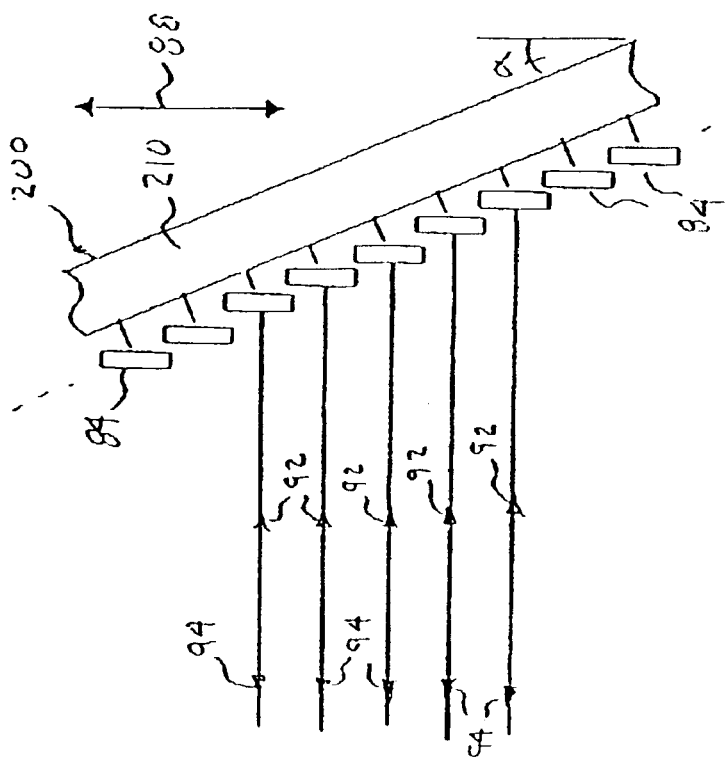
FIG. 14a is a pictorial cross-sectional view of the micro-mirror device of FIG. 12 showing a partial row of micro-mirrors, when the micro-mirror surfaces are disposed in a first position orthogonal to the light beam of the input signal in accordance with the present invention.
Figure 14B:
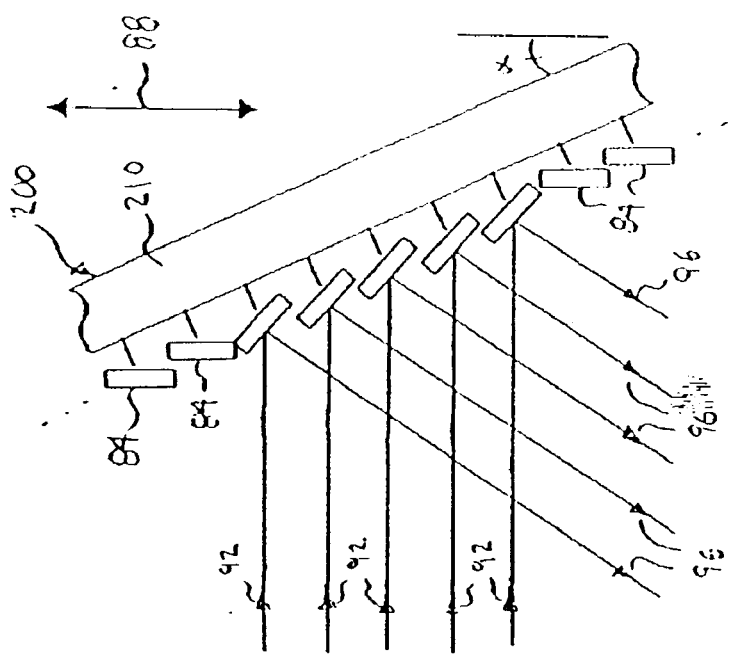
FIG. 14b is a pictorial cross-sectional view of the micro-mirror device of FIG. 12 showing a partial row of micro-mirrors, when the micro-mirror surfaces are disposed in a second position perpendicular to the light beam of the input signal in accordance with the present invention.

FIGS. 14a and 14b illustrate the orientation of a micro-mirror device 200 similar to that shown in FIG. 12, wherein neither the first or second position (i.e., on or off state) of the micro-mirrors 84 is parallel to the base or substrate 210 of the micro-mirror device 200, as shown in FIGS. 4a and 4b. Consequently as shown in FIG. 14a, the base 210 of the micro-mirror device 200 is mounted at a non-orthogonal angle a relative to the collimated light 83 to position the micro-mirrors 84, which are disposed at the first position, perpendicular to the collimated light 44, so that the light reflected off the micro-mirrors in the first position reflect substantially back through the return path, as indicated by arrows 94, to provide the output signal 48 at optical fiber 50. Consequently, the tilt angle of the mirror between the horizontal position and the first position (e.g., 10 degrees) is approximately equal to the angle α of the micro-mirror device. FIG. 14b is illustrative of the micro-mirror device 200 when the micro-mirrors 84 are disposed in the second position to drop an input channel 14 to the output signal 48 at optical fiber 50.

Figure 15:
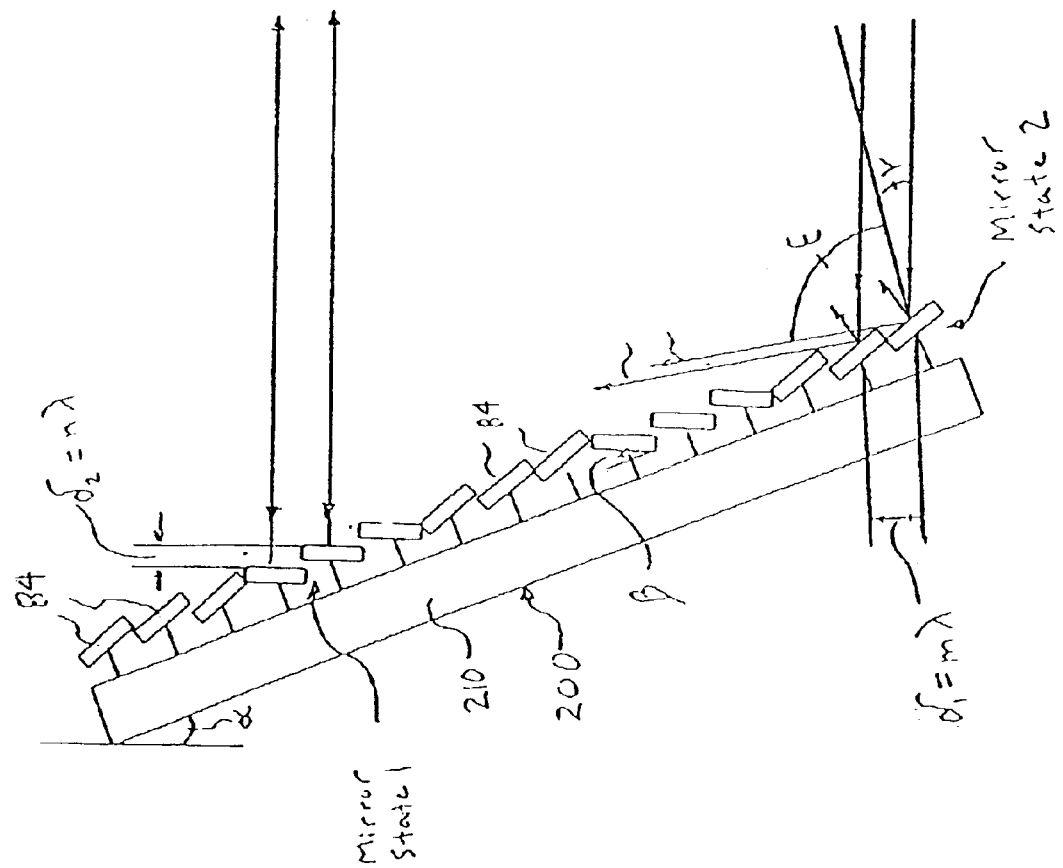
FIG. 15 is a pictorial cross-sectional view of the micro-mirror device of FIG. 12 disposed at a predetermined angle in accordance with the present invention.

In using the micro-mirror array device 200, it is important that the reflection from each micro-mirror 84 adds coherently in the far field, so the angle a to which the micro-mirror device 200 is tilted has a very strong influence on the overall efficiency of the device. FIG. 15 illustrates the phase condition of the micro-mirrors in both states (i.e., State 1, State 2) for efficient reflection in either condition.

Figure 16:
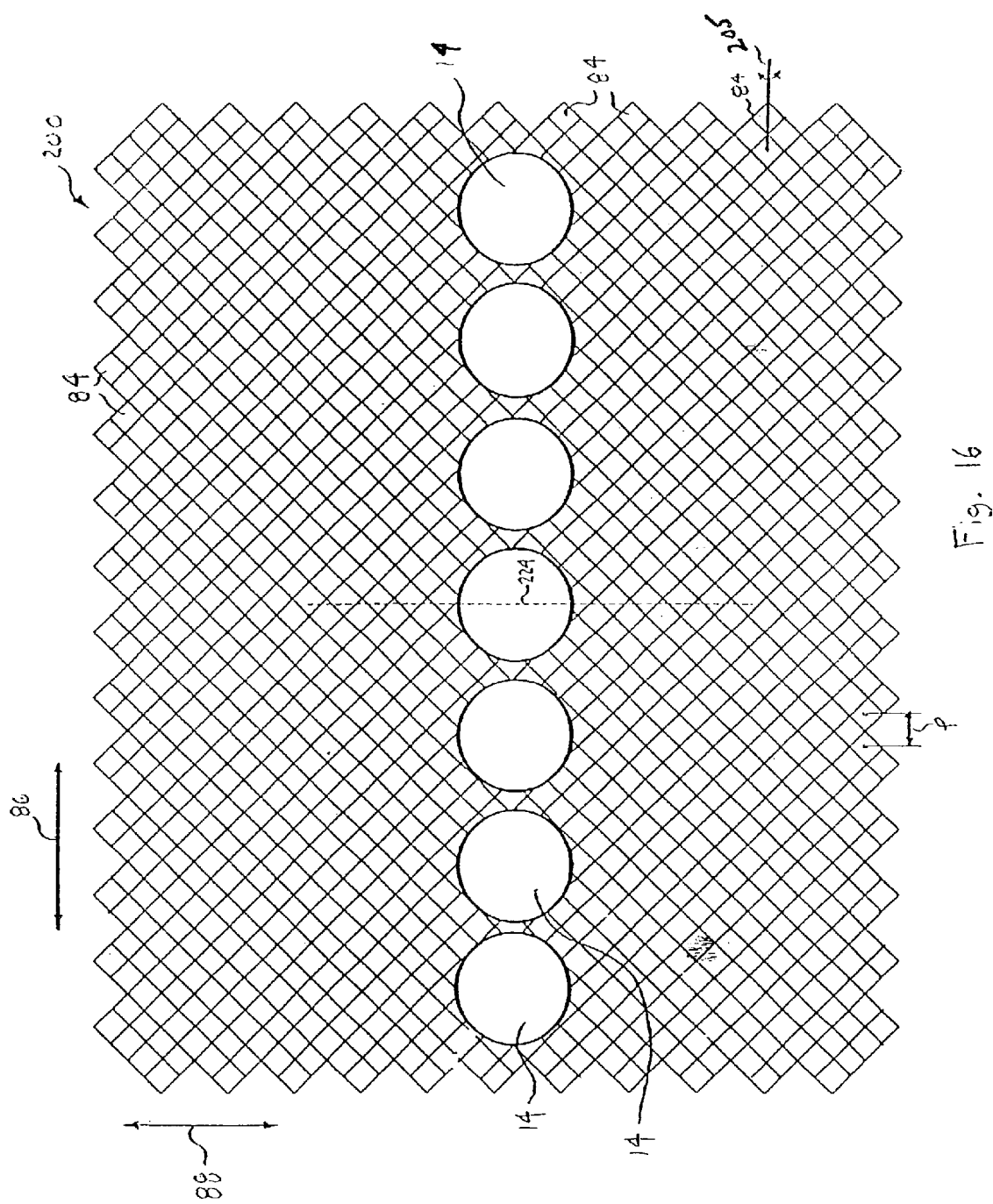
FIG. 16 is an expanded front view of the micromirror device of the spatial light modulator of FIG. 15, wherein the optical channels of a WDM input signal are distinctly projected onto the micro-mirror device, in accordance with the present invention.

In an exemplary embodiment of the micro-mirror device 200 in FIG. 15, the effective pixel pitch ρ is about 19.4 μm (see FIG. 16), so for a mirror tilt angle β of 9.2 degrees, the array is effectively blazed for Littrow operation in the n=+2 order for the position indicated as Mirror State 1 in FIG. 16 (i.e., first position). For Mirror State 2, the incident angle γ on the micro-mirror device 200 is now 9.2 degrees and the exit angle ε from the array is 27.6 degrees. Using these numbers, the micro-mirror device is nearly blazed for fourth-order for mirrors in Mirror State 2.

Figure 13:
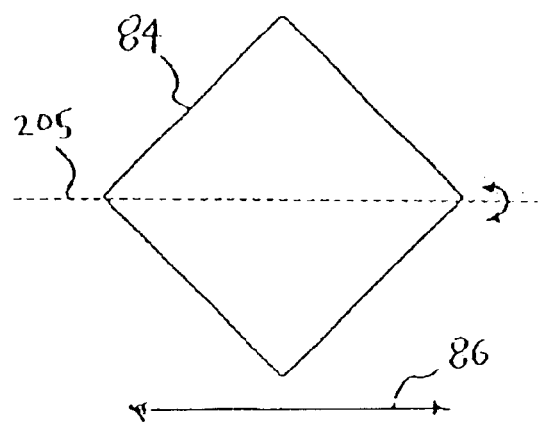
FIG. 13 is a plan view of a micro-mirror of the micro-mirror device of FIG. 12.

As described hereinbefore, the micro-mirrors 84 of the micro-mirror device 200 flip about a diagonal axis 205 as shown in FIGS. 13 and 16. In an exemplary embodiment of the present invention shown in FIG. 16, the optical input channels 14 are focused on the micro-mirror device 200 such that the spectral axis 86 of the optical channels 14 is parallel to the tilt axis 205 of the micro-mirrors. This configuration is achieved by rotating the micro-mirror device 45 degrees compared to the configuration shown in FIG. 3. Alternatively, the optical channels 14 may be focused such that the spectral axis 86 of the channels are perpendicular to tilt axis 205 of the micro-mirrors similar to that shown in FIGS. 9 and 10. Further, one will appreciate that the orientation of the tilt axis 205 and the spectral axis 86 may be at any angle.

While the embodiments of the present invention described hereinabove illustrate a single blocking filter using a set of optical components, it would be advantageous to provide an embodiment including a plurality of blocking filters that uses a substantial number of common optical components, including the spatial light modulator.

Figure 17:
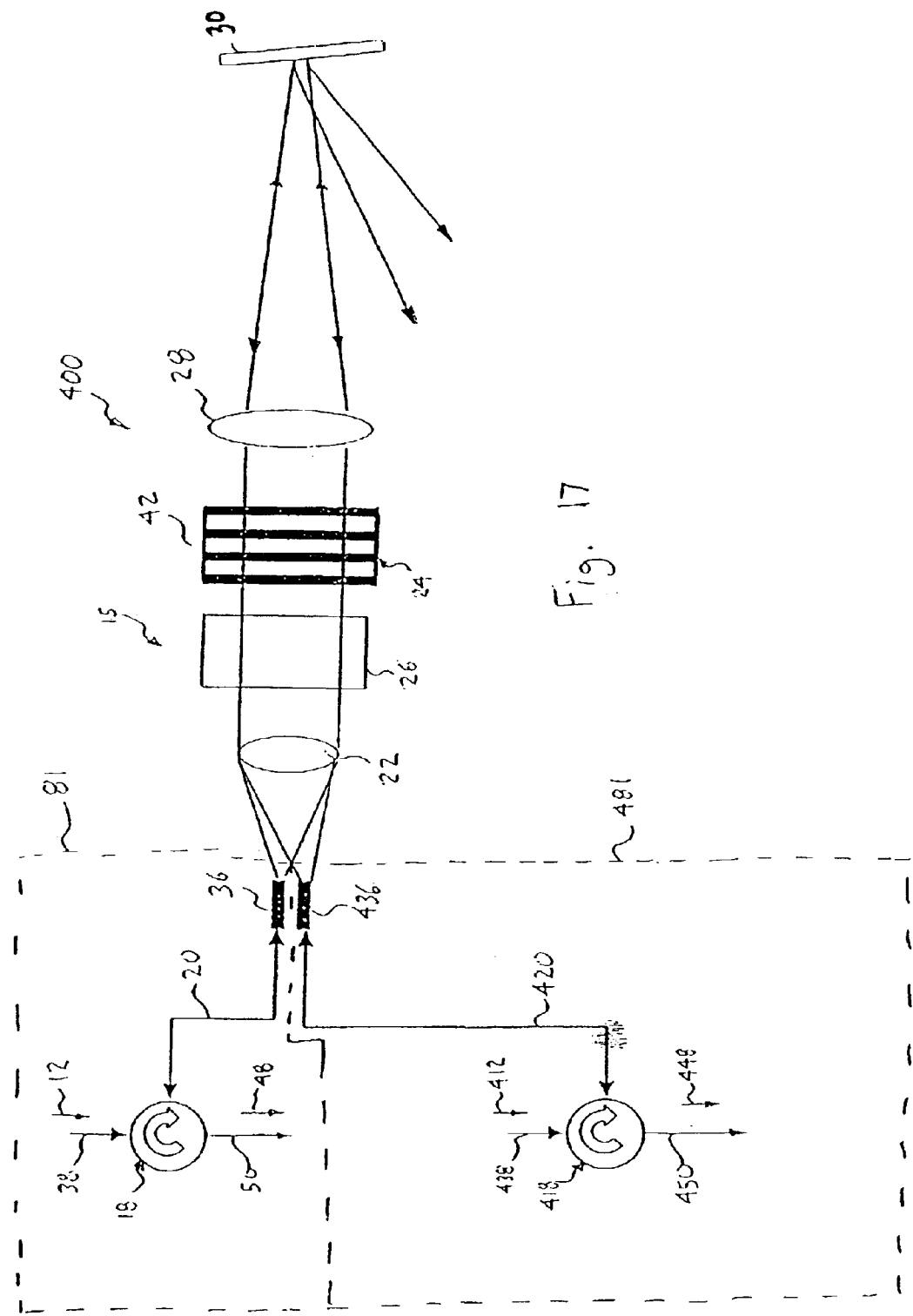
FIG. 17 is a top plan view of another embodiment of an optical blocking filter including a plurality of blocking filters using a single spatial light modulator, in accordance with the present invention.

FIG. 17 illustrates such an embodiment of a blocking filter 400, which is substantially the same as the blocking filter 10 in FIG. 1 having a spatial light modulator 300 including a micro-mirror device 22 of FIG. 16. Common components between the embodiments have the same reference numerals. The blocking filter 400 provides a pair of blocking filters (i.e., filter, filter$_2$), each of which use substantially all the same optical components, namely the collimating lens 22, the mirror 26, the diffraction grating 24, the bulk lens 28 and the spatial light modulator 300. The first blocking filter (blocking filter$_1$) is substantially the same as the blocking filter 10 of FIG. 10. The second blocking filter (filter$_2$) is provided by adding a complementary set of input optical components 481. The input optical components 81 of the first blocking filter (filter$_1$) and the input optical components 481 of the second blocking filter (filter$_2$) have the same last two numerals, and therefore the input optical components 481 of second blocking filter are the same as those of similar components 81 of the first blocking filter.

Figure 18:
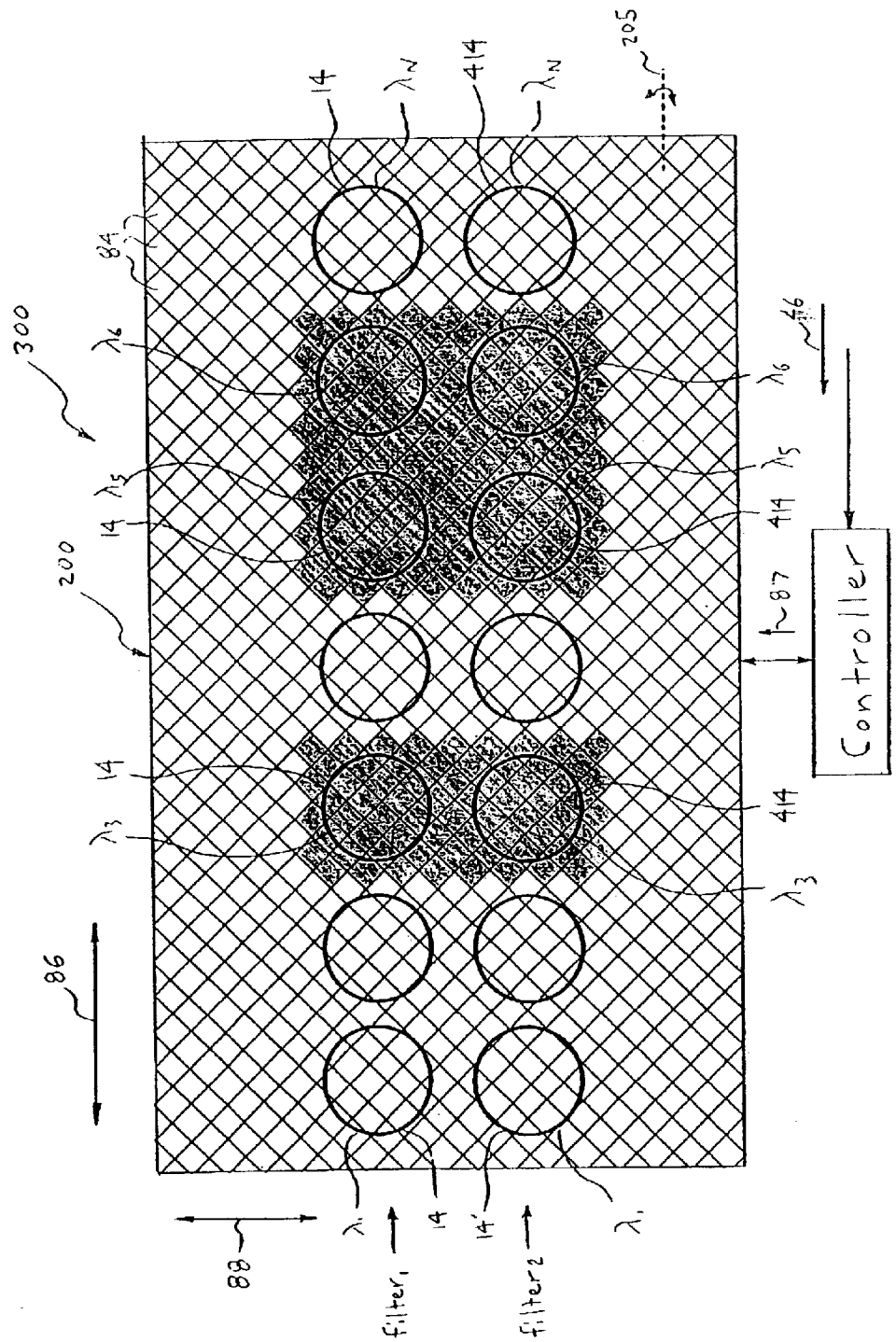
FIG. 18 is a front view of the spatial light modulator of the optical blocking filter of FIG. 17, wherein the optical channels of a plurality of WDM input signals are distinctly projected onto the micro-mirror device, in accordance with the present invention.
Figure 19:
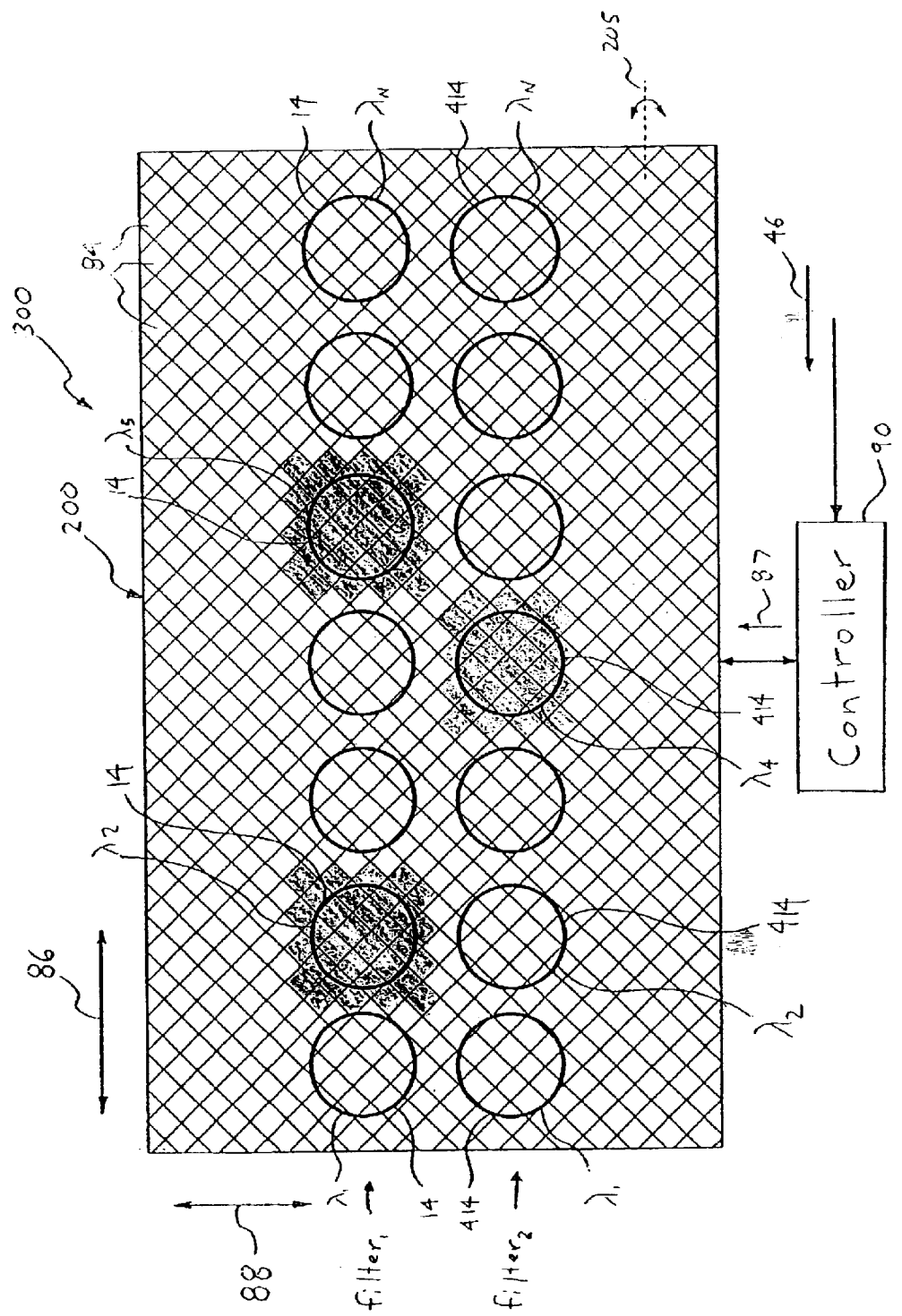
FIG. 19 is a front view of the spatial light modulator of the optical blocking filter of FIG. 17, wherein the optical channels of a plurality of WDM input signals are distinctly projected onto the micro-mirror device, in accordance with the present invention.

To provide a plurality of blocking filters (filter$_1$, filter$_2$) using similar components, each blocking filter uses a different portion of the micro-mirror device 200, as shown in FIG. 18, which is accomplished by displacing spatially the ends 36,436 of the pigtails 20,420 of the blocking filters. As shown, the input channels of each blocking filter are spaced in the spatial axis 88 a predetermined distance on the micro-mirror device 200, as shown in FIG. 18. Similar to that described hereinabove, the groups of micro-mirrors 370, 372 of shaded micro-mirrors 84 delete the optical channels at $\lambda_3$, $\lambda_5$ and $\lambda_6$ of both blocking filters (blocking filter$_1$, blocking filter$_2$), and reflect the through input channels at $\lambda_1$, $\lambda_2$, $\lambda_4$, and $\lambda_7$–$\lambda_N$ back to each respective input pigtail 20, 420. One will recognize that while the same optical channels are reflected back to the first pigtail (at $\lambda_1$, $\lambda_2$, $\lambda_4$, and $\lambda_7$–$\lambda_N$, for example) in the embodiment shown in FIG. 18, the micro-mirrors 84 may be tilted to individually reflect back different optical input channels 14,414, as shown in FIG. 19.

Figure 20:
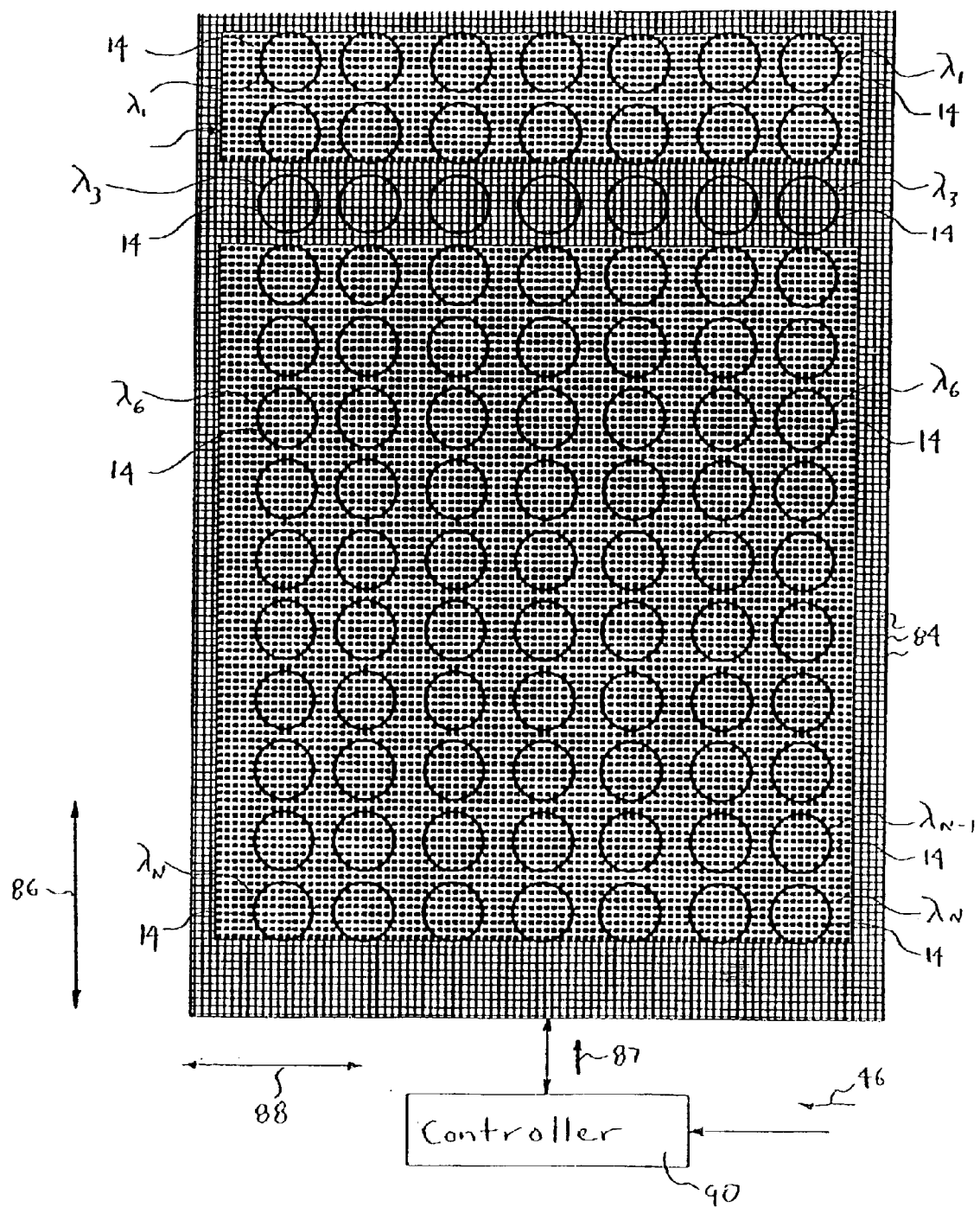
FIG. 20 is a front view of a spatial light modulator of the optical blocking filter of FIG. 17, wherein groups of micro-mirrors are tilted to select respective input channels from the plurality of WDM input signals, in accordance with the present invention.

FIG. 20 illustrates the micro-mirror device 480 of another embodiment of the present invention similar to that shown in FIGS. 17 and 18, wherein the embodiment has N number of blocking filters (filter$_1$–filter$_N$). The embodiment includes N number of complementary input optical components 81,481 (see FIG. 17) that provide respective input signals to the set of common optical components 20, 22, 24, 26, 28, 480. The embodiment functions substantially the same as the blocking filter 400 of FIG. 17, as described hereinbefore.

Figure 21:
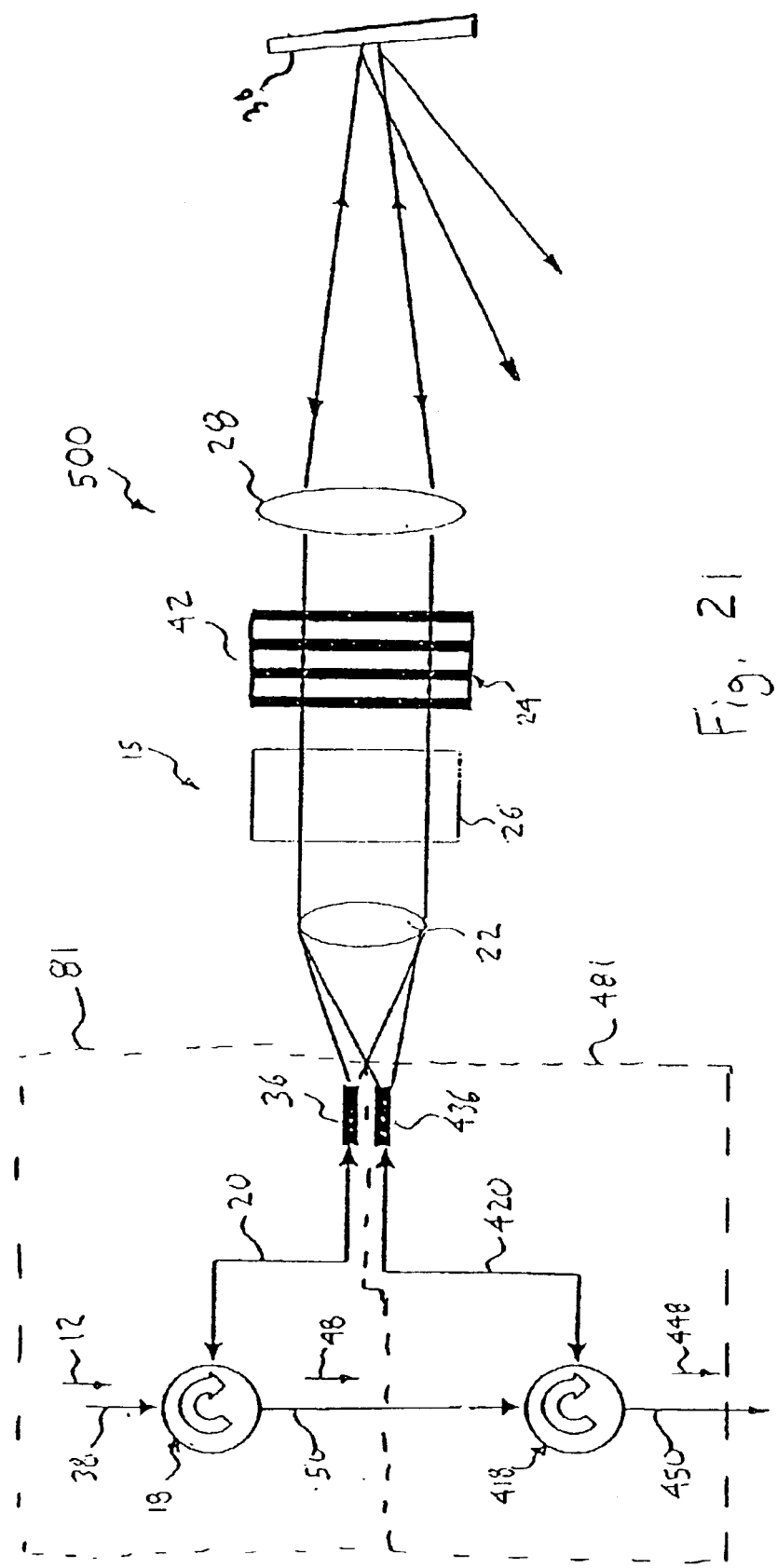
FIG. 21 is a top plan view of a dual pass optical blocking filter including a spatial light modulator, in accordance with the present invention.
Figure 22:
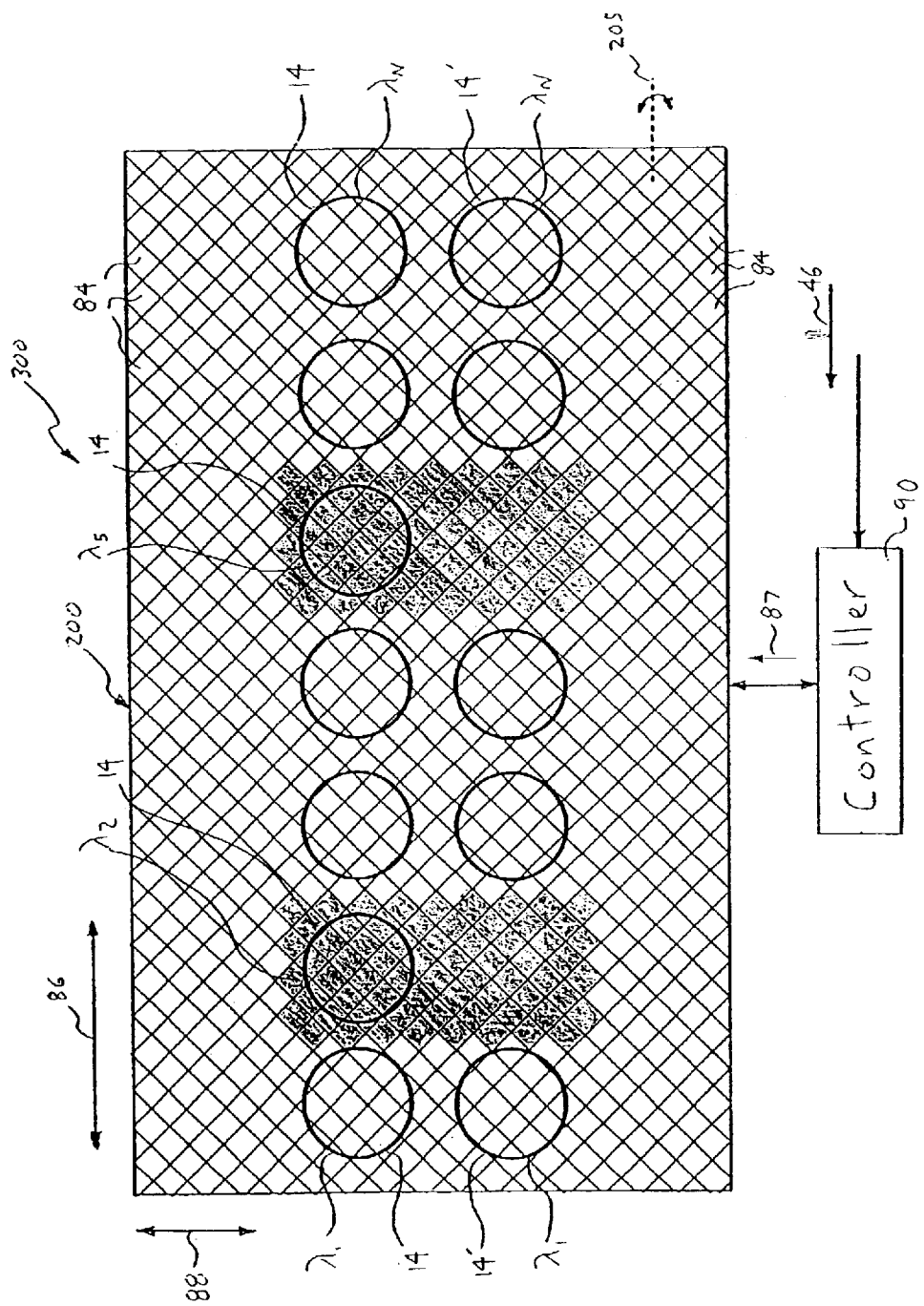
FIG. 22 is a front view of the spatial light modulator of the optical blocking filter of FIG. 21, wherein the optical channels of a plurality of WDM input signals are distinctly projected onto the micro-mirror device, in accordance with the present invention.

A further embodiment of the present invention includes a dual pass or double bounce blocking filter 500, as shown in FIGS. 21 and 22. The dual pass blocking filter 500 is substantially similar to the dual blocking filter 400 shown in FIG. 17, and therefore common components have the same reference numeral. Functionally, the dual pass blocking filter 500 reflects the through optical input channel off the spatial light modulator 300 and through the optics 22, 24, 26, 28 twice. The multiplicative properties of the double pass technique provide a very narrow filter function having steep sides and greater isolation between filter functions.

The ability to control the tilt patterns of the micro-mirror device enables the shape (e.g., narrowness) and center wavelength to be statically or dynamically modified, which is similar to that disclosed in U.S. patent application Ser. Nos. 09/648,525 and 09/751,589, which are incorporated herein by reference.

Referring to FIGS. 21 and 22 in the operation of the blocking filter 500, the input signal 12 is first dispersed by the diffraction grating 24 onto the micro-mirror device 200. Each input channel 14 is spread along the spectral axis 86 as shown in FIG. 22. Similar to that described hereinabove, the groups of micro-mirrors 370, 372 of shaded micro-mirrors 84 delete the optical input channels at $\lambda_2$ and $\lambda_5$ of the input signal 12, and reflect the through input channels at $\lambda_1, \lambda_3, \lambda_4$, and $\lambda_6-\lambda_N$ back to the first pigtail 20. The through input channels at $\lambda_1, \lambda_3, \lambda_4$, and $\lambda_6-\lambda_N$ then propagate to second pigtail 420 through the first and second circulators 20,420 respectively. The end 436 of the second pigtail 420 is displaced spatially such that the through input channels 14' at $\lambda_1, \lambda_3, \lambda_4$, and $\lambda_6-\lambda_N$ are dispersed onto the micro-mirror device 200 and spaced in the spatial axis 88 a predetermined distance from the input channels 14 at $\lambda_1, \lambda_3, \lambda_4$, and $\lambda_6-\lambda_N$, as shown in FIG. 22. The micro-mirrors 84 are titled to reflect the selected input channel 14' back to second pigtail 420, while the micro-mirrors adjacent the input channels at $\lambda_2$ and $\lambda_5$ are tilted to delete any remaining light. The through input channels 14' then propagate through the second circulator 418 to the output fiber 450.

While the micro-mirror patterns that reflect the desired input channel 14 and the selected input channel 14' are shown to be the same, one will recognize that the patterns may be different such that the each pattern reflects a different portion of the desired input channel 14 and the selected input channel 14', which results in a different overall blocking filter function.

The blocking filters 10, 110 may be configured for any wavelength plan by simply modifying the software. For example, an blocking filter for deleting a 50 Ghz WDM optical signal may be modified to delete a 100 Ghz or 25 Ghz WDM optical signal by simply modifying or downloading a different switching algorithm, without modifying the hardware. In other words, the blocking filter may be modified by simply changing statically or dynamically the switching algorithm (e.g., modifying the bit map) to accommodate any designs, upgrades, modifications or adjustments of the optical network (such as variances in the spacing of the channels, the shapes of the light beams, and/or the center wavelength of the light beams), or compensate for changes (e.g., thermal or mechanical drift) of the blocking filter. For example, the software can be modified or written to provide a first pattern of micro-mirrors 84 having a predetermined width that pass a selected 50 Ghz optical channel(s) 14 back to the output fiber, and/or provide a second pattern of micro-mirrors 84 having a predetermined width that reflects a selected 100 Ghz optical channel(s) back to the output fiber, wherein the width of the first pattern is greater than the width of the second pattern.

Figure 23:
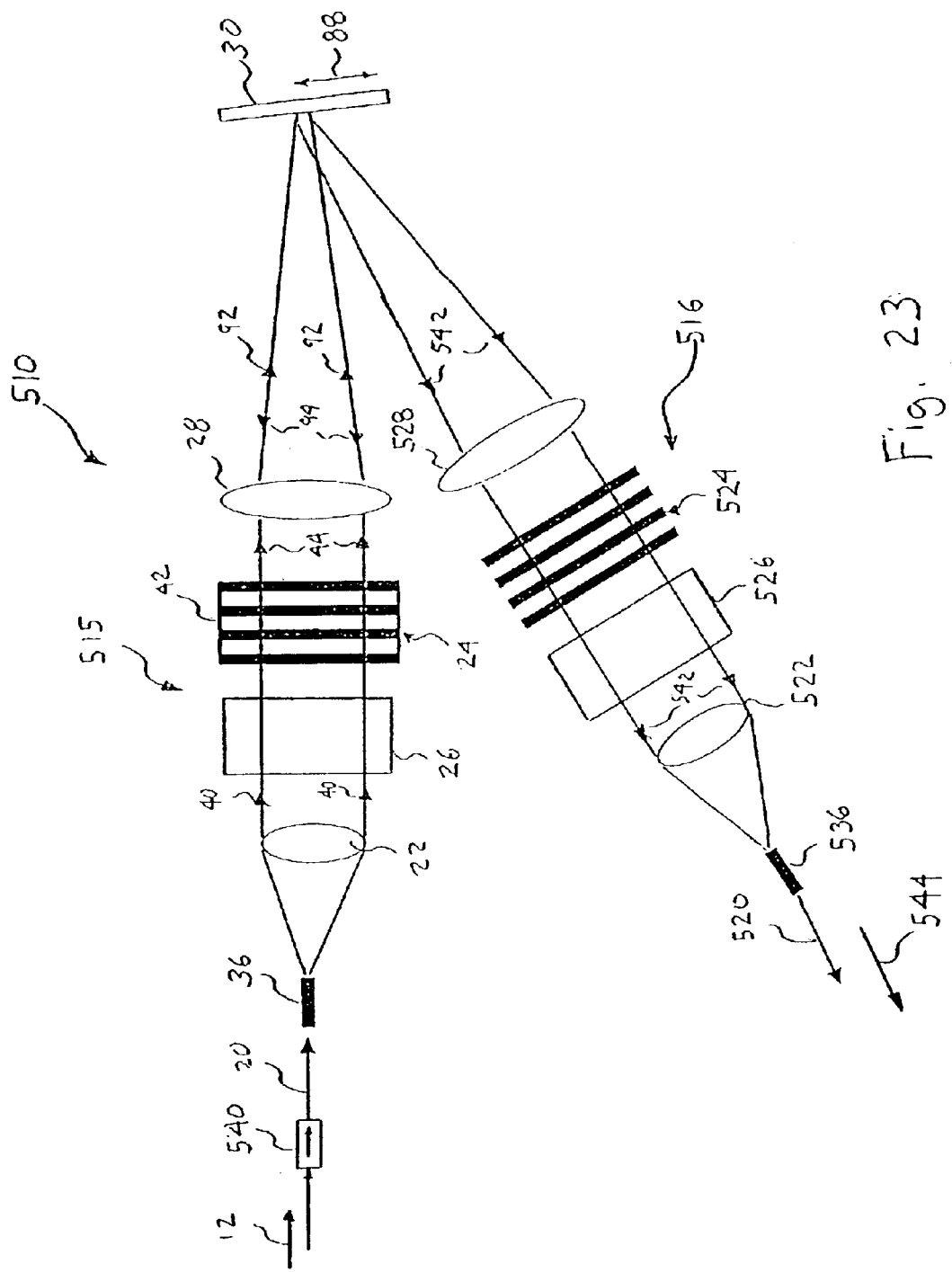
FIG. 23 is a top plan view of another embodiment of a blocking filter including a spatial light modulator, in accordance with the present invention.

Another embodiment of a blocking filter 510 is shown in FIG. 23, which is similar to the blocking filter 10 of FIG. 1. The blocking filter 510 includes a pair of similar optical portions 515,516 for providing respective optical input channels 14 to and receiving the input channels from the spatial light modulator 30. The optical components 520, 522, 524, 526, 528, 536 of the optical portion 516 are substantially similar to the complementary optical components 20, 22, 24, 26, 28, 36 of the first optical portion 515.

In the operation of the blocking filter 510, the micro-mirrors 84 of the spatial light modulator are tilted to reflect all the deleted input channels 14 of the input signal 12 back along the return path 94, which are blocked by the optical isolator 540. The through optical channels are reflected along the output optical path 542 to provide the output signal 544 at pigtail 520.

Figure 24:
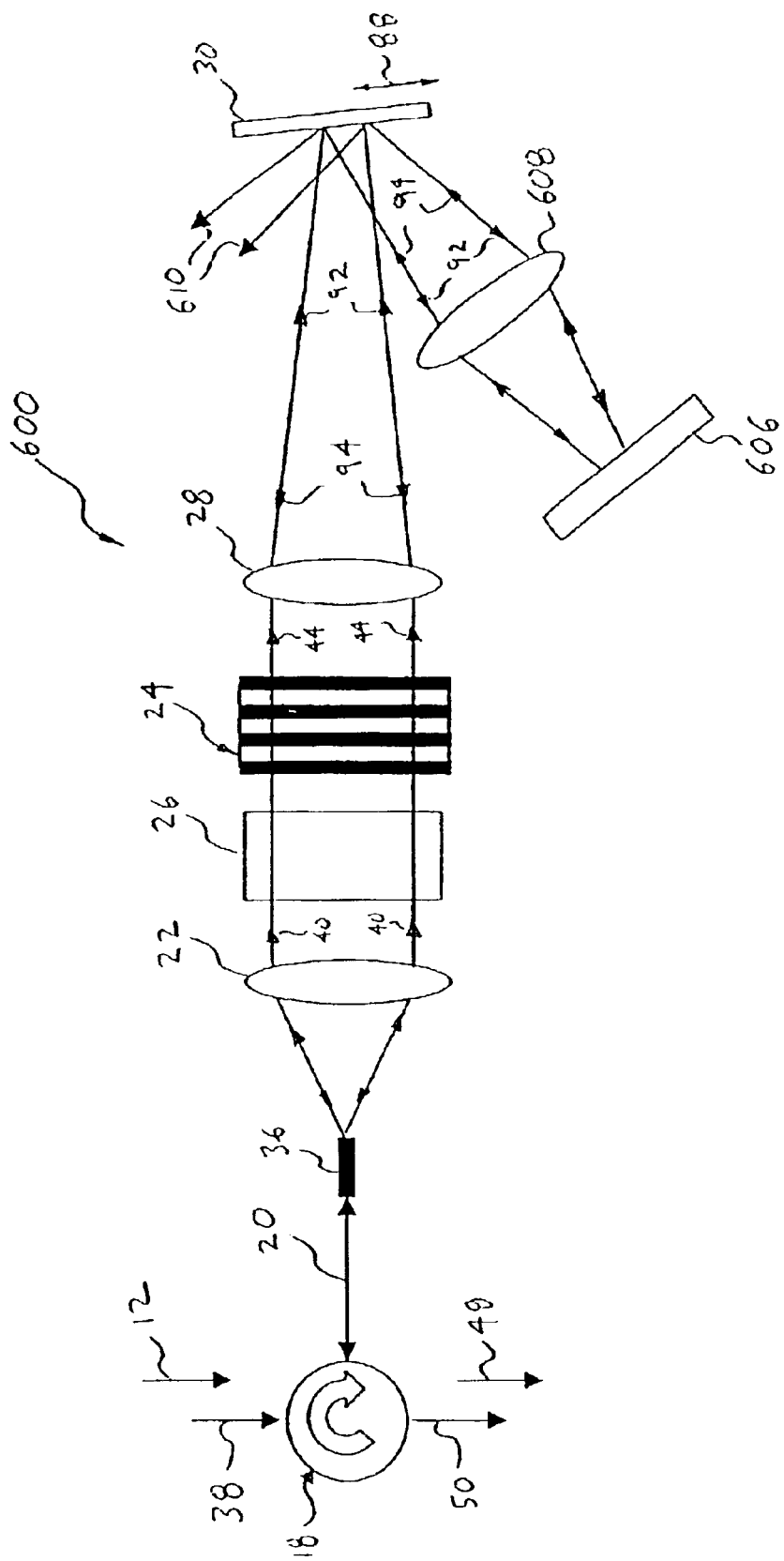
FIG. 24 is a top plan view of another embodiment of an optical blocking filter including a spatial light modulator, in accordance with the present invention.

Referring to FIG. 24, another exemplary embodiment of a blocking filter 600 is shown that is similar to the blocking filter 510 of FIG. 23, and therefore, similar components have the same reference numerals. The optical components are disposed in two tiers or horizontal planes similar to the embodiments discussed hereinbefore. Specifically, the three-port circulator 18, the pigtail 20, the collimator 22 and the diffraction grating 24 are disposed in a first tier or horizontal plane. The mirror 26, the bulk lens 28 and the spatial light modulator 30 are disposed in the second tier or horizontal plane. Further, the mirror 606 and the lens 608 are disposed in the second tier.

The circulator 18 directs the input signal 12 from the optical fiber 38 to the pigtail 20. The input signal 12 exits the first pigtail (into free space) and passes through the collimator 22, which collimates the input signal. The collimated input signal 40 is incident on the diffraction grating 24, which separates spatially the optical input channels 14 of the collimated input signal 40 by diffracting or dispersing the light from the diffraction grating. The diffraction grating 24 directs the separated light 44 to the mirror 26 disposed in the second tier. The mirror 26 reflects the separated light 44 to the bulk lens 28 (e.g., a Fourier lens), which focuses the separated light onto the micro-mirror device 82 of the spatial light modulator 30, as shown in FIG. 2. In response to a switching algorithm and input command 46, the spatial light modulator 300 selectively reflects the through channel(s) 14 of the input signal through the lens 608 to the mirror 606, and back through common optical components to pigtail 20. The deleted channels are reflected away from the return optical path 94, as indicated by arrows 610.

In the operation of the blocking filter 600, the micro-mirrors 84 of the spatial light modulator 30 are tilted to a first position to delete a desired optical channel(s) from the WDM input signal 12 by directing the deleted channels away from the return path 94 and the first optical path 92, as indicated by arrow 610. The micro-mirrors 84 of the spatial light modulator 30 are tilted to a second position to reflect the through optical channels 14 of the input signal 12 through the lens 608 to the mirror 606 which then reflects the through channel(s) back along the return path 94 to provide the output signal 48 at optical fiber 50. While the blocked or deleted channels are directed along the optical path 610, some scattered light of the blocked optical channels propagate along the first optical path 92. This edge scattering from the micro-mirrors limits the extinction of the blocked channel that can be achieved.

By properly choosing the angle of incidence of the signal light onto the spatial light modulator, the coherent scattering from the blocked channel mirrors can be directed away from the return path 94 and provide the highest blocked channel extinction.

Under conditions of power loss the mirrors of the spatial light modulator revert to a neutral position, splitting the angle between the first position and the second position and lying parallel to the spatial light modulator substrate. Choosing this position orthogonal to the input light beam provides a fail safe device that in the advent of power loss reverts to a condition in which all input channels are propagated through the device.

Figure 25:
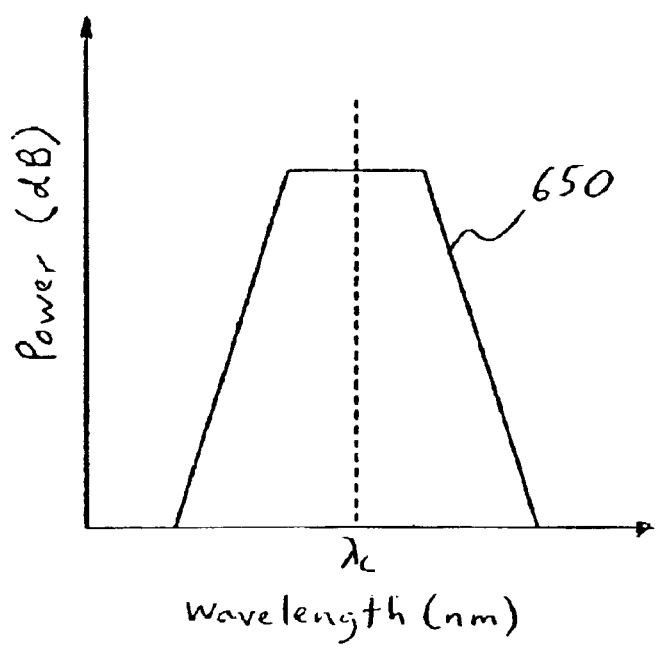
FIG. 25 is a plot of the filter function of the micromirror device of FIG. 16 disposed in a diagonal orientation.

FIG. 25 illustrates the resulting transfer function or filter function 650, centered at $\lambda_c$, of the micromirrors 85 of the micromirror device 200, which is similar to that shown in FIGS. 16 and 19. As shown, the micromirror device 200 is rotated 45 degrees. Consequently the sides of the transfer function are sloping as a result of the serrated edges of the micromirrors in this diagonal orientation. The total device transfer function is the convolution of the mirror transfer function and the optics point spread function.

Figure 26:
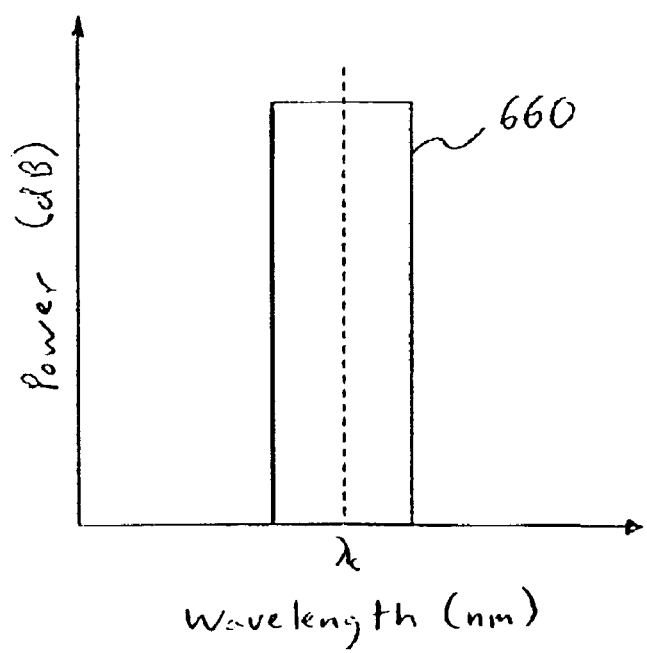
FIG. 26 is a plot of the filter function of the micromirror device of FIG. 16 disposed in a orthogonal orientation.
Figure 27:
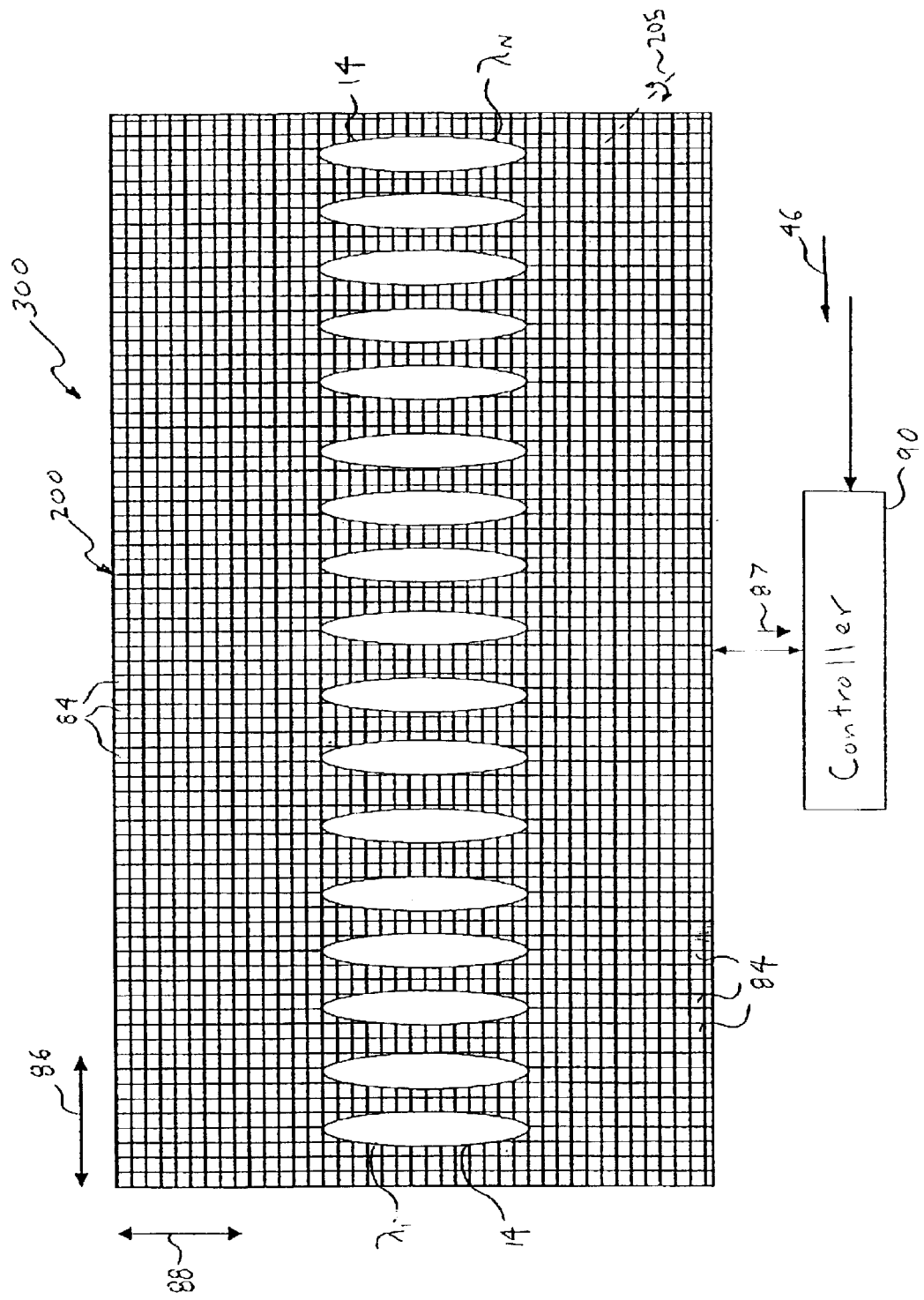
FIG. 27 is a front view of the spatial light modulator of the optical blocking filter, wherein the optical channels of a plurality of WDM input signals are distinctly projected onto the micro-mirror device, in accordance with the present invention.

FIG. 26 illustrates the resulting transfer function of filter function 660, centered at $\lambda_c$, of the micromirrors 85 of the micromirror device 200, which is similar to that shown in FIGS. 16 and 19, except the micromirror is not rotated 45 degrees. As shown in FIG. 27, the micromirror device 200 is oriented in an orthogonal orientation such that the micromirror edges align with the spectral and spatial axes of the optical system. Further, the micromirrors 84 tilted about the diagonal axis 205. Consequently, the sides of the transfer function 660 are substantially more parallel than the transfer function 650 of FIG. 25 to provide a much sharper transfer function due to the parallel edge of the micromirrors.

One will appreciate that each portion or pixel of light reflects the optical channel by a percentage defined by the number of micro-mirrors 84 illuminated by the optical input channel. For example, assuming each optical channel 14 illuminates 300 micro-mirrors, each micro-mirror is representative of approximately 0.3% of light (or approximately 0.02 Db) of the optical signal when the micro-mirror is tilted away. The above example assumes that the intensity of the light of each optical channel is uniform over the entire cross-section of the beam of light. One will appreciate that the intensity from one end to the other end of the beam of the optical channel may be Gaussian in shape, and therefore, the intensity of the pixels of light at the ends of the beams of the optical channels 14 is less than the center portion of the beams, which advantageously increases the resolution of the power of the selected input channel 14, the greater the resolution of the power of the redirected portion of that optical channel.

One skilled in the art will appreciate that a diffraction grating has a predetermined polarization dependence loss (PDL) associated therewith. The PDL of a diffraction grating 24 is dependent on the geometry of the etched grooves 42 of the grating. Consequently, means to mitigate PDL may be desired. One method of mitigating the PDL for any of the embodiments described hereinbefore is to provide a $\lambda/4$ plate (not shown) between the spatial light modulator 30 and the diffraction grating 24 (before or after the bulk lens 28). The fast axis of the $\lambda/4$ plate is aligned to be approximately 45 degrees to the direction or axis of the lines 42 of the diffraction grating 24. The mirror is angled to reflect the separated channels back through the $\lambda/4$ plate to the diffraction grating. In transiting the phase plate twice, a phase difference $\pi$ is accumulated between the components at 45 degrees to the grating and the orthogonal component. Since $\pi$ is equivalent to a multiplication by a negative sign, this produces a reflection of a vector about the 45 degree axis. Effectively, the $\lambda/4$ plate averages the polarization of the light aligned and orthogol to the grating to reduce or eliminate the PDL. One will appreciate that the $\lambda/4$ plate may not be necessary if the diffraction grating has low polarization dependencies, or other PDL compensating techniques are used.

Figure 28:
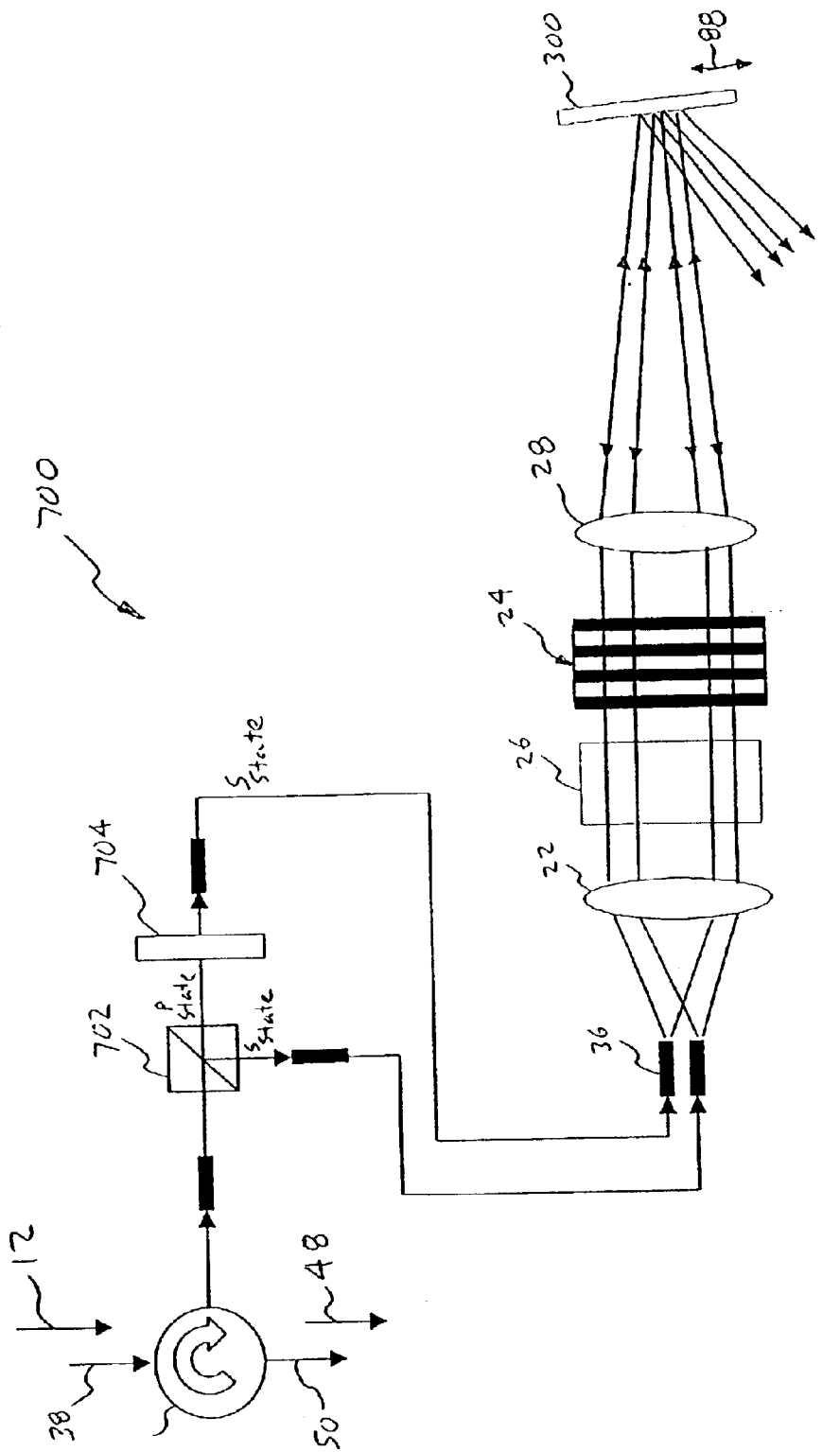
FIG. 28 is a block diagram of another embodiment of a blocking filter including a spatial light modulator, in accordance with the present invention.
Figure 29:
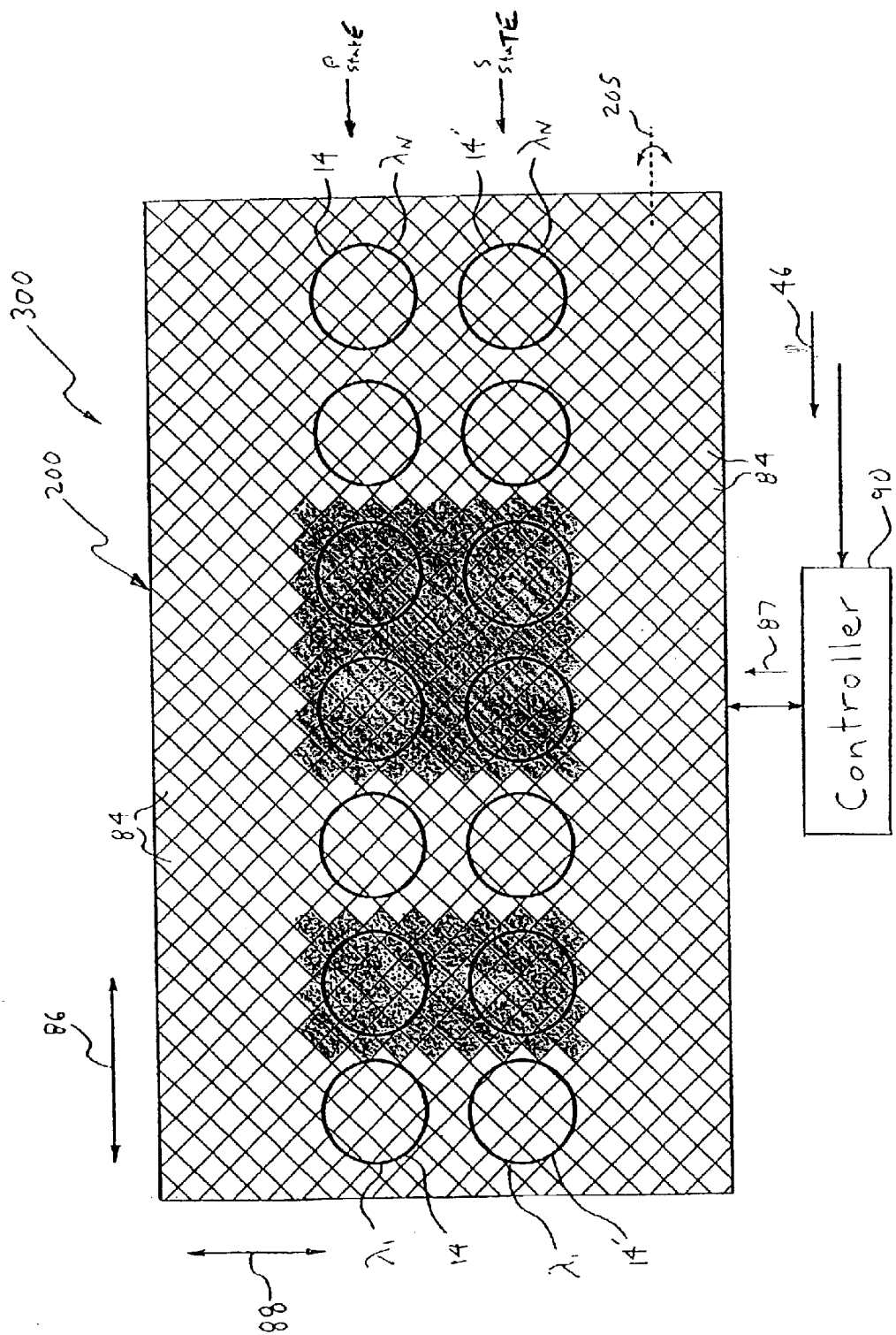
FIG. 29 is a front view of the spatial light modulator of the optical blocking filter of FIG. 28, wherein the optical channels of a plurality of WDM input signals are distinctly projected onto the micro-mirror device, in accordance with the present invention.

FIG. 28 illustrates another embodiment of an optical blocking filter 700 that compensates for the grating differential loss associated with different polarization states. In this embodiment, the signal component of the input signal is initially separated into each polarization state (i.e., P state and S state) one of a number of polarization separators 702, such as a Wollistan prism, a polarization beam splitter and a fiber coupler. The component having the poorest grating reflection coefficient, normally the P polarization state, is rotated using a $\lambda/2$ wave plate 704 into the most favorable grating polarization state. The polarization components are then provided to a pair of pigtail 20, 720, which are spatially separated to provide the light beams separate in the spatial plane. Each component (or polarization state) including the frequency components is dispersed and imaged onto the micromirror device 730, as shown in FIG. 29, which are retro-reflected by the micromirror device. The retro-reflection of the components along return optical path removes any polarization rotation imparted in the first pass. The retro-reflected polarization states are then recombined with each other by the polarization separator 702 and wave plate 704 to provide the output signal 48 at optical fiber 50. The first grating PDL mitigation technique effectively averages to grating loss in the two polarization states. The current technique provides a grating loss of the least lossy component. Particularly, for strongly dispersive gratings 24, this embodiment can provide significantly lower device insertion loss.

As shown in FIG. 29, the pattern of micromirrors 84 tilted to block or deleted an optical channel or block of channels extends over both components of the optical channel.

While the micro-mirrors 84 may switch discretely from the first position to the second position, as described hereinabove, the micro-mirrors may move continuously (in an "analog" mode) or in discrete steps between the first position and second position. In the "analog" mode of operation the micro-mirrors can be can be tilted in a continuous range of angles. The ability to control the angle of each individual mirror has the added benefit of much more attenuation resolution than in the digital control case. In the "digital" mode, the number of micro-mirrors 84 illuminated by each channel determines the attenuation step resolution. In the "analog" mode, each mirror can be tilted slightly allowing fully continuous attenuation of the return beam. Alternatively, some combination of micro-mirrors may be switched at a predetermined or selected pulse width modulation to attenuate the optical channel or band.

One will appreciate that each embodiment described hereinbefore and those contemplated by the present invention may function as a tunable single pass or double pass filter, bandpass filter and/or optical drop device by eliminating the optical detector (i.e., photodiode 51).

The present invention also contemplates including the function of selectively attenuating the through channels of the optical blocking filter of any described hereinbefore. In the combined embodiment, the desired optical channels may be attenuated by tilting a selected number of micromirrors associated with a through channel 14 to direct a portion of the channel away from the return path, similar to that described in U.S. patent applications Ser. No. 60/281,079, entitled "Reconfigurable Pixelated Optical Filter" and U.S. patent application Ser. No. 60/311,002, entitled "Dynamic Optical Filter Having an Array of Micromirrors", which are incorporated herein by reference in their entirety. In a specific embodiment, the dual function blocking filter may function as a dynamic gain flattening filter, wherein the through channels are attenuated to have equal power levels in response to optical feedback provided by an optical detector.

Figure 30:
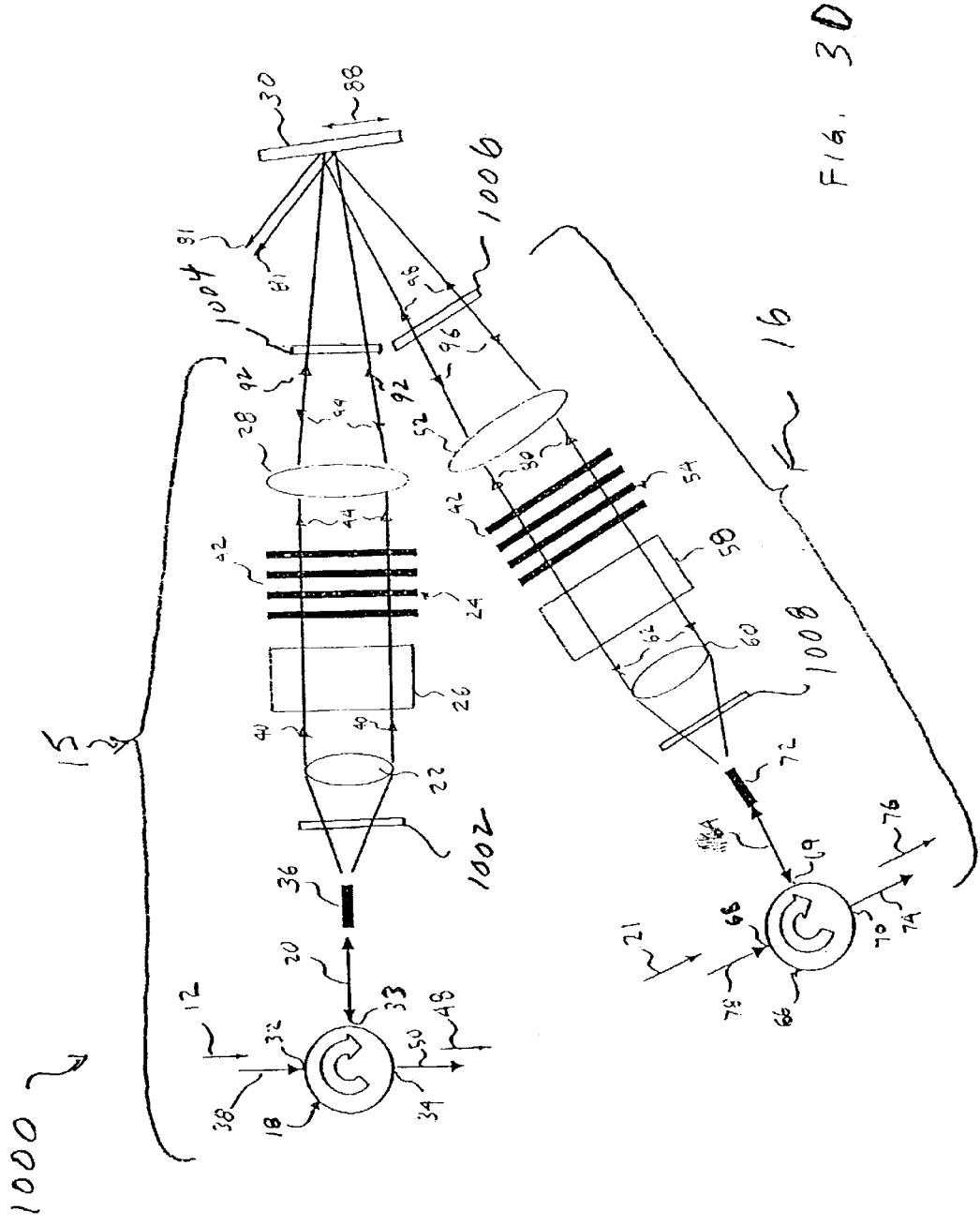
FIG. 30 shows an alternative embodiment of an optical channel monitor one or more optic devices for minimizing polarization dispersion loss (PDL)

FIG. 30 shows an embodiment of an optical blocking filter generally indicated as 1000 having optical portions 15, 16 with one or more optical PDL devices 1002, 1004, 1006, 1008 for minimizing polarization dependence loss (PDL). The one or more optical PDL devices 1002, 1008 are arranged between the capillary tube 36 and the grating 24, while the one or more optical PDL devices 1004, 1006 are arranged between the grating 24 and the spatial light modulator 30.

The optical PDL device 1002 may include a polarization splitter for splitting each channel into its pair of polarized light beams and a rotator for rotating one of the polarized light beams of each optical channel. The optical PDL device 1008 may include a rotator for rotating one of the previously rotated and polarized light beams of each optical channel and a polarization splitter for combining the pair of polarized light beams of each channel.

The one or more optical devices 1002, 1004, 1006, 1008 may be incorporated in any of the embodiments shown and described above, including but not limited to the embodiments shown in FIGS. 1, 8, 9, 17, 21, 23, 24, and 28. In effect, as a person skilled in the art will appreciate, a diffraction grating such as the optical elements 42, 54 has a predetermined polarization dependence loss (PDL) associated therewith. The PDL of the diffraction grating 24 is dependent on the geometry of the etched grooves 42 of the grating. Consequently, means to mitigate PDL may be desired. The λ/4 plate between the spatial light modulator 30 and the diffraction grating(s) 24, 54 (before or after the bulk lens 28, 52) mitigates the PDL for any of the embodiments described hereinbefore. The fast axis of the λ/4 plate is aligned to be approximately 45 degrees to the direction or axis of the lines 42 of the diffraction grating 24. The mirror is angled to reflect the separated channels back through the λ/4 plate to the diffraction grating. In the first pass through the λ/4 plate, the λ/4 plate circularly polarizes the separated light. When the light passes through the λ/4 plate again, the light is linearly polarized to effectively reflect the polarization about an axis 45 degrees to the grating. Effectively, the λ/4 plate averages the polarization of the light to reduce or eliminate the PDL. One will appreciate that the λ/4 plate may not be necessary if the diffraction grating has low polarization dependencies, or other PDL compensating techniques are used that are known now or developed in the future.

As shown and described herein, the polarized light beams may have a generally circular cross-section and are imaged at separate and distinct locations on the spatial light modulator 30, such that the polarized light beams of the optical channels do not substantially overlap spatially when focused onto the spatial light modulator, as shown, for example, in FIGS. 3, 6, 7, 10, 11, 16, 18, 19, 20, 22, 27 and 29.

Figure 31:
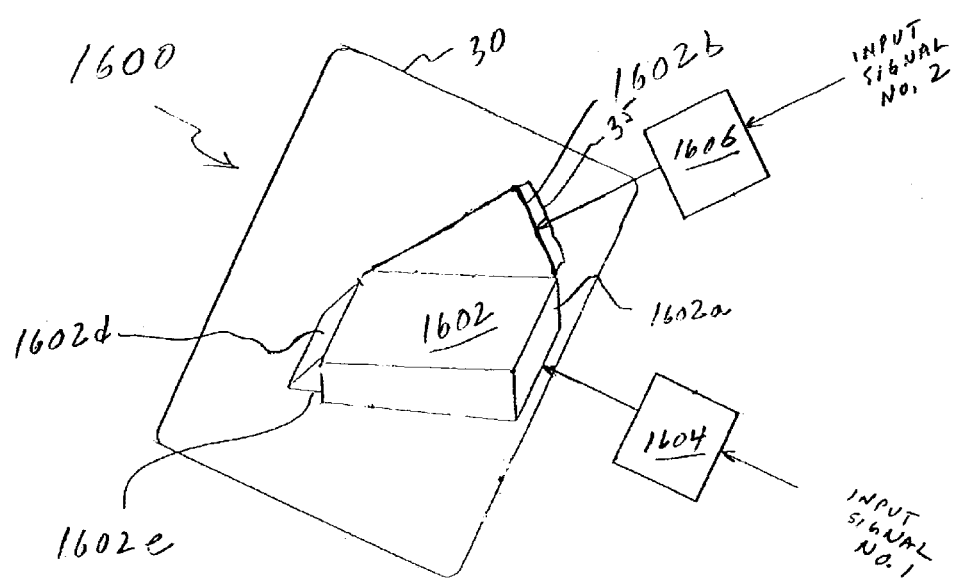
FIG. 31 shows an embodiment of a channel monitor having a chisel prism in accordance with the present invention.
Figure 32:
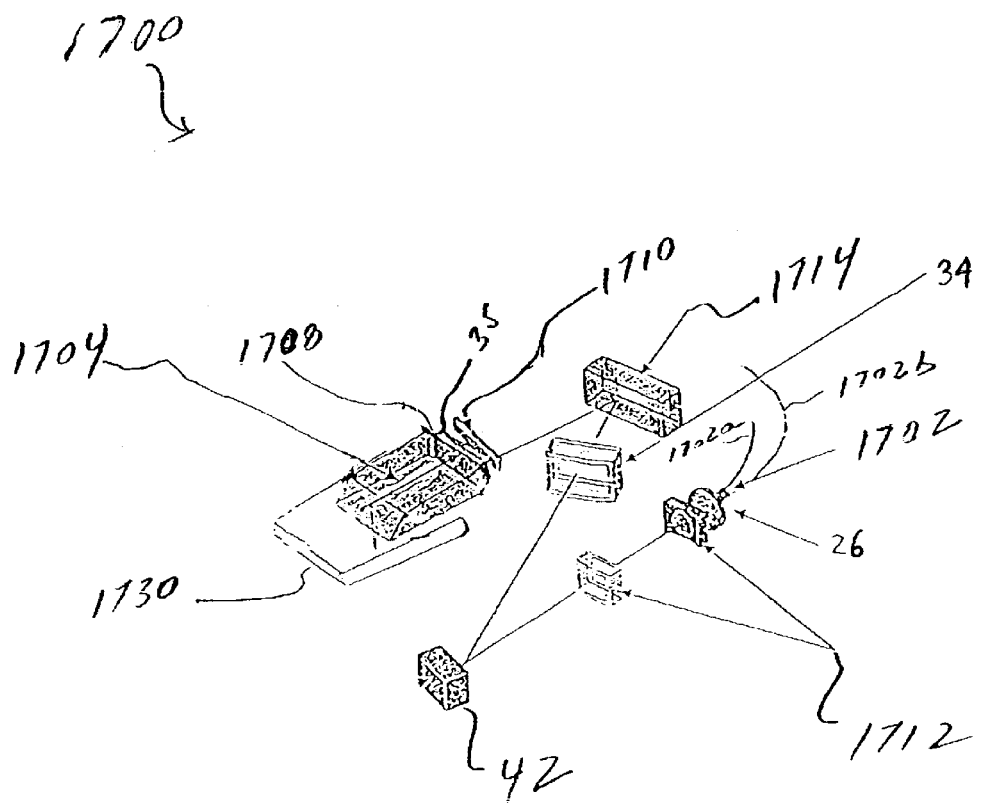
FIG. 32 shows an alternative embodiment of a channel monitor having a chisel prism in accordance with the present invention.

FIG. 32 shows the DMD portion of an optical blocking filter generally indicated as 1600 similar to that shown above, except that the DMD device of the spatial light modulator is laid down and arranged in a horizontal position in relation to the optical components discussed above in order to reduce the profile of the overall packaging. (In the embodiments discussed above, the DMD chip in the spatial light modulator is arranged vertical in relation to the optical components.) In FIG. 31, the micromirror device is rotated and lies in the plane of the optical path oriented such that the tilt axis 85 is perpendicular to the spectral axis 86, similar to that discussed above. The blocking filter 1600 has a chisel prism 1602 arranged in relation to the spatial light modulator 30, a set of optical components 1604, a retromirror 1605 and a complimentary set of optical components 1606. The chisel prism 1602 rotates the optical input and output signals onto the spatial light modulator 30. The underlying configuration of the blocking filter 1600 may be implemented in any of the embodiments show and described above in which the pivot or tilt axis of the mirrors of the micromirror device 30 is perpendicular to the spectral axis of the channels projected on the micromirror device 30. A single set of optical components 1604 may be used in suitable embodiments similar to that shown in FIGS. 1, 8, 9, 24 and 28, while the complimentary set of optical components 1606 may also be used in suitable embodiments similar to that shown in FIGS. 17, 21 and 23.

The set of optical components 1604 and the complimentary set of optical components 1606 are similar to the optical portions 15, 16 shown and described herein. For example, see FIG. 1A. The spatial light modulator 30 is shown and described herein as the well known micromirror device. The chisel prism 1602 has multiple faces, including a front face 1602a, a beveled front face 1602b, a rear face 1602d and a bottom face generally indicated by 1602e. Light from the set of optical components 1604 and the complimentary set of optical components 1606 passes through one or more faces of the chisel prism 1602, reflects off the spatial light modulator back to the chisel prism 1602, reflects off one or more internal surfaces of the chisel prism 1602 and passes back through the chisel prism 1602, passes back to the set of optical components 1604 or the complimentary set of optical components 1606.

The chisel prism design described herein addresses a problem in the optical art when using micro-mirror devices. The problem is the ability to send a collimated beam out to a reflective object and return it in manner that is insensitive to the exact angular placement of the reflective object. Because a light beam is typically collimated and spread out over a relatively large number of micro-mirrors, any overall tilt of the array causes the returned beam to "miss" the optical component, such as a pigtail, intended to receive the same.

The present invention provides a way to reduce the tilt sensitivity by using a classical optical design that certain combinations of reflective surfaces stabilize the reflected beam angle with respect to angular placement of the reflector. Examples of the classical optical design include a corner-cube (which stabilize both pitch and yaw angular errors) or a dihedral prism (which stabilize only one angular axis.).

One advantage of the configuration of the present invention is that it removes the tilt sensitivity of the optical system (which may comprise many elements besides a simple collimating lens such as element 26 shown and described above) leading up to the retro-reflective spatial light modulator 30. This configuration allows large beam sizes on the spatial light modulator without the severe angular alignment sensitivities that would normally be seen.

Patent application Ser. No. 10/115,647, which is hereby incorporated by reference, shows and describes the basic principal of these highly stable reflective elements in which all the surfaces of the objects being stable relative to one another, while the overall assembly of the surfaces may be tilted without causing a deviation in reflected angle of the beam that is large compared to the divergence angle of the input beam.

FIG. 32 illustrates a schematic diagram of an optical blocking filter generally indicated as 1700 having a chisel prism 1704 that provides improved sensitivity to tilt, alignment, shock, temperature variations and packaging profile, which incorporates such a tilt insensitive reflective assembly. The scope of the invention is intended to include using the chisum prism technology described herein in any one or more of the embodiments described herein having a single optical input signal. Similar to that discussed above in relation to FIG. 31, the chisel prism configuration may be suitable adapted to for use in any one or more of the embodiments described herein having two optical input signals.

Similar to the embodiments described hereinbefore, and by way of example, the blocking filter 1700 includes a first set of optical components having a dual fiber pigtail 1702 (circulator free operation), the collimating lens 26, a bulk diffraction grating 42, a Fourier lens 34, a ¼λ plate 35, a reflector 26 and a spatial light modulator 1730 (similar to that shown above). The dual fiber pigtail 1702 includes a transmit fiber 1702a and a receive fiber 1702b. The first set of optical components typically provide a first optical input signal having one or more optical bands or channels on the receive fiber 1702b, as well as providing an optical output signal on the transmit fiber 1702b.

Similar to the embodiment described above, the chisel prism 1704 has multiple internally reflective surfaces, including a top surface, and a back surface, as well as transmissive surfaces including a front surface and a bottom surface. The micro-mirror device 1730 is placed normal to the bottom surface of the chisel prism 1704, as shown. In operation, the chisel prism 1704 reflects the first optical input signal from the first set of optical components to the spatial light modulator 1730, and reflects the optical output signal back to the first set of optical components.

The chisel prism 1704 decreases the sensitivity of the optical filter to angular tilts of the optics. The insensitivity to tilt provides a more rugged and robust device to shock vibration and temperature changes. Further, the chisel prism 1704 provides greater tolerance in the alignment and assembly of the optical filter 1700, as well as reduces the packaging profile of the filter. To compensate for phase delay associated with each of the total internal reflection of the reflective surfaces of the prism (which will be described in greater detail hereinafter), a λ/9 wave plate 1708 is optically disposed between the prism 1704 and λ/4 wave plate 35. An optical wedge or lens 1710 is optically disposed between the λ/4 wave plate 35 and the diffraction grating 42 for directing the output beam from the micro-mirror device 1730 to the receive pigtail 1702a of the dual fiber pigtail 1702b. The optical wedge or lens 1710 compensates for pigtail and prism tolerances. The scope of the invention is intended to cover embodiments in which the optical wedge 1710 is arranged parallel or oblique to the front surface of the wedge 1704. Moreover, as shown, these components are only arranged in relation to one front surface; however, as a person skilled in the art would appreciate, these optical components would typically be arranged in relation to any one or more front surfaces shown in FIG. 36, as well as the front surfaces in the other chisel prism embodiments shown ad described herein.

The optical device 1700 further includes a telescope 1712 having a pair of cylindrical lens that are spaced a desired focal length. The telescope 1712 functions as a spatial beam expander that expands the input beam (approximately two times) in the spectral plane to spread the collimated beam onto a greater number of lines of the diffraction grating. The telescope 1712 may be calibrated to provide the desired degree of beam expansion. The telescope advantageously provides the proper optical resolution, permits the package thickness to be relatively small, and adds design flexibility.

A folding mirror 1714 is disposed optically between the Fourier lens 34 and the λ/4 wave plate 35 to reduce the packaging size of the optical filter 1700.

Figure 33:
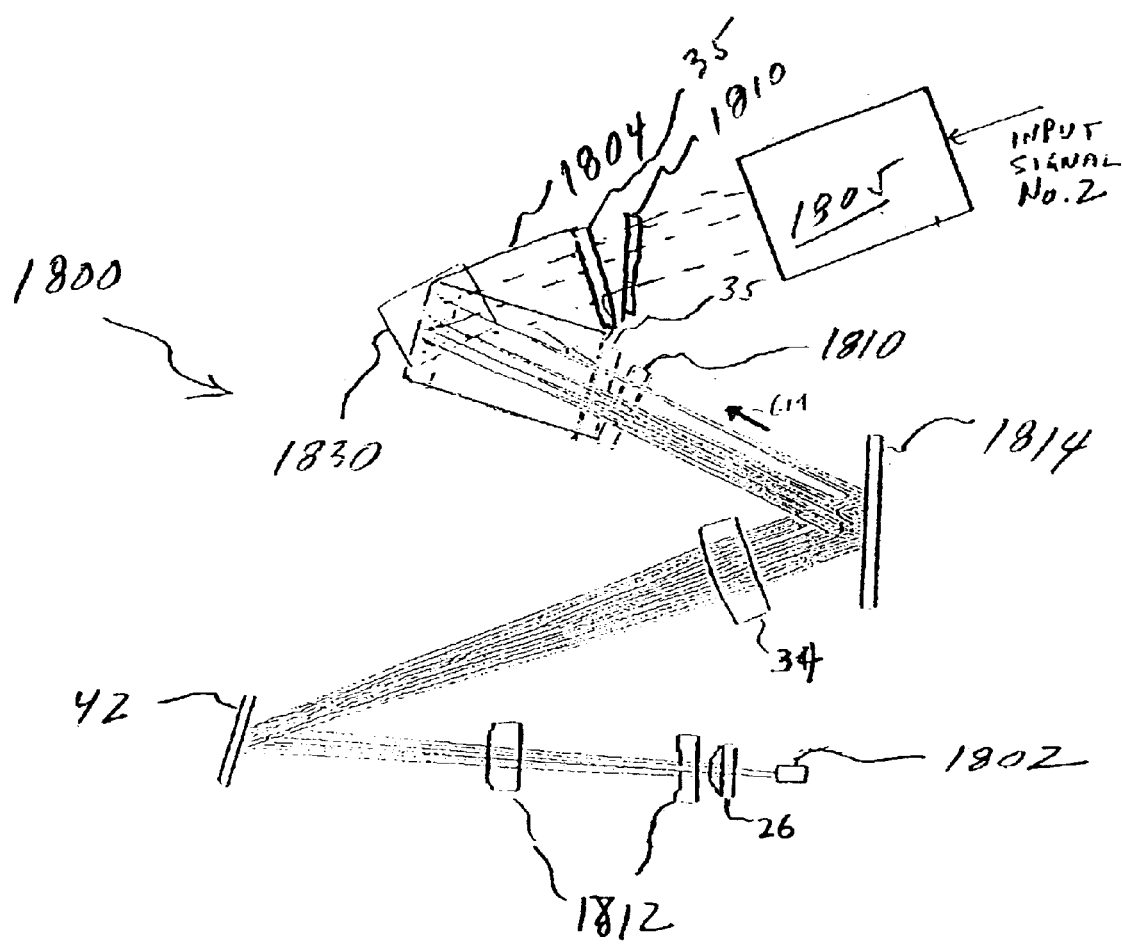
FIG. 33 shows an alternative embodiment of a channel monitor having a chisel prism in accordance with the present invention.

FIG. 33 shows another embodiment of a tilt-insensitive reflective assembly 1800 having a specially shaped prism 1804 arranged in relation to the micro-mirror device 1830, a set of optical components as shown and a compliment set of optical components generally indicated as 1805 consistent with that discussed above.

Unlike an ordinary 45 degree total internal reflection (TIR) prism, in this embodiment the back surface of the chisel prism 1804 is cut at approximately a 48 degree angle relative to the bottom surface of the chisel prism 1804. The top surface of the chisel prism 1804 is cut at a 4 degree angle relative to the bottom surface to cause the light to reflect off the top surface via total internal reflection. The front surface of the chisel prism 1804 is cut at a 90 degree angle relative to the bottom surface. The chisel prism 1804 therefore provides a total of 4 surface reflections in the optical assembly (two TIRs off the back surface, one TIR off the micromirror device 1830, and one TIR off the top surface.)

In order to remove the manufacturing tolerances of the prism angles, a second smaller compensating prism or wedge 1810 (or wedge), having a front surface cut at a shallow angle (e.g., as 10 degrees) with respect to a back surface, may also be used. Slight tilting or pivoting about a pivot point of the compensation wedge 1810 causes the light beam to be pointed in the correct direction for focusing on the receive pigtail 1802.

The combination of the chisel prism 1804 and the compensation wedge 1810 allows for practical fabrication of optical devices that spread a beam out over a significant area and therefore onto a plurality of micro-mirrors, while keeping the optical system robust to tilt errors introduced by vibration or thermal variations.

In FIG. 34, the input light rays 1826a first pass through the λ/4 wave plate 35 and the λ/9 wave plate 1840. The input rays 1826a reflect off the back surface 1821 of the prism 1804 the micro-mirror device 1830. The rays 1826b then reflect off the micromirror device 1830 back to the back surface 1821 of the prism 1804 The rays 1826b then reflect off the top surface 1822 for a total of 4 surfaces (an even number) and passes through the front surface 1823 of the prism 1804. The rays 1826b then pass back through the λ/4 wave plate 35 and the λ/9 wave plate 1840 to the wedge 1810. The wedge 1810 redirects the output rays 1826c to the receive pigtail 1802. As shown by arrows 1851, the wedge 1810 may be pivoted about its long axis 1850 during assembly to slightly steer the output beam 1826c to the receive pigtail 1802 with minimal optical loss by removing manufacturing tolerances of the chisel prism.

In FIG. 33, the prism 1804 (with wave plates 35, 1840 mounted thereto) and the micro-mirror device 1830 are mounted or secured in fixed relations to each other. The prism 1804 and micro-mirror device 1830 are tilted a predetermined angle off the axis of the input beam 614 (e.g., approximately 9.2 degrees) to properly direct the input beam onto the micromirrors of the micromirror device, as described hereinbefore. The wedge 1810 however is perpendicular to the axis of the input beam 1826a. Consequently, the receive pigtail of the dual fiber pigtail 1802 is rotated a predetermined angle (approximately 3 degrees) from a vertically aligned position with the transmit pigtail. Alternatively, the wedge 1810 may be rotated by the same predetermined angle as the prism and the micromirror device (e.g., approximately 9.2 degrees) from the axis of the input beam. As a result, the receive pigtail of the dual pigtail assembly 1802 may remain vertically aligned with transmit pigtail.

THE SCOPE OF THE INVENTION

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. An optical blocking filter for receiving an optical signal having one or more optical bands or channels, characterized in that
the optical blocking filter comprises a spatial light modulator having a micro-mirror device with an array of micro-mirrors for selectively deflecting the one or more optical bands or channels so that each optical band or channel is reflected off a respective plurality of micromirrors to eliminate a selected band or channel or a specified selection of bands or channels from the optical signal provided along an optical return path, wherein scattered light from a dropped signal is directed onto the micromirror device to reflect away from the return path.

2. An optical blocking filter according to claim 1, wherein the optical blocking filter comprises an optical arrangement for providing the optical signal along an optical path to the array of micromirrors.

3. An optical blocking filter according to claim 2, wherein the optical arrangement is a free optics arrangement.

4. An optical blocking filter according to claim 3, wherein the free optics arrangement provides the optical signal to the spatial light modulator, and also provide an optical output signal having each remaining band or channel reflected off the spatial light modulator.

5. An optical blocking filter according to claim 4, wherein the free optics arrangement includes either one or more circulators, one or more waveguides, or a combination thereof.

6. An optical blocking filter according to claim 5, wherein the one or more circulators includes a pair of circulators.

7. An optical blocking filter according to claim 6, wherein the one or more circulators includes a three port circulator.

8. An optical blocking filter according to claim 5, wherein the one or more waveguides includes a pair of capillary tubes.

9. An optical blocking filter according to claim 5, wherein the free optics arrangement comprise a further optical portion for receiving a reflected optical signal from the spatial light modulator and providing a re-reflected optical signal back to the spatial light modulator.

10. An optical blocking filter according to claim 9, wherein the re-reflected optical signal is reflected off the spatial light modulator and eliminated.

11. An optical blocking filter according to claim 9, wherein the further optical portion includes a bulk lens, a reflector, or a combination thereof.

12. An optical blocking filter according to claim 9, wherein the further optical portion includes a mirror for re-reflecting the optical signal back to the spatial light modulator.

13. An optical blocking filter according to claim 4, wherein the free optics arrangement includes a collimator, a reflective surface, a dispersion element, a bulk lens, or a combination thereof.

14. An optical blocking filter according to claim 13, wherein the collimator includes either an aspherical lens, an achromatic lens, a doublet, a GRIN lens, a laser diode doublet, or a combination thereof.

15. An optical blocking filter according to claim 13, wherein the reflective surface includes a mirror.

16. An optical blocking filter according to claim 15, wherein the reflective surface is curved.

17. An optical blocking filter according to claim 13, wherein the bulk lens includes a Fourier lens.

18. An optical blocking filter according to claim 13, wherein the dispersion element has a low PDL.

19. An optical blocking filter according to claim 13, wherein the dispersion element includes a diffraction grating, a tilted grating, an echelle grating, an etalon, a prism or a holographic optical device.

20. An optical blocking filter according to claim 3, wherein the free optics arrangement includes one or more optical PDL mitigating devices for minimizing polarization dependence loss (PDL).

21. An optical blocking filter according to claim 20, wherein one optical PDL mitigating device is arranged between a waveguide and a grating in the optical arrangement, and another optical PDL mitigating device is arranged between a grating and the spatial light modulator.

22. An optical blocking filter according to claim 20, wherein the one or more optical PDL mitigating devices include a pair of optical PDL mitigating devices.

23. An optical blocking filter according to claim 20, wherein the one or more optical PDL mitigating devices includes one optical PDL mitigating device having a polarization splitter for splitting each channel into a pair of polarized light beams and a rotator for rotating one of the polarized light beams of each optical channel.

24. An optical blocking filter according to claim 23, wherein the one or more optical PDL mitigating devices includes another optical PDL mitigating device having a rotator for rotating one of the previously rotated and polarized light beams of each optical channel and a polarization splitter for combining the pair of polarized light beams of each channel.

25. An optical blocking filter according to claim 20, wherein the one or more optical PDL mitigating devices includes a ·/4 plate.

26. An optical blocking filter according to claim 2, wherein the optical arrangement includes a chisel prism having multiple faces for modifying the direction of the optical signal.

27. An optical blocking filter according to claim 26, wherein the multiple faces include at least a front face, a rear face, a top face and a bottom face.

28. An optical blocking filter according to claim 26, wherein the optical light from the free optics arrangement passes through one or more faces of the chisel prism, reflects off one or more internal surfaces of the chisel prism, reflects off the spatial light modulator, again reflects off the one or more internal surfaces of the chisel prism, and passes back to the free optics arrangement.

29. An optical blocking filter according to claim 2, wherein the optical arrangement includes a field correction lens for respectively compensating for the one or more channels reflecting of the spatial light modulator.

30. An optical blocking filter according to claim 1, wherein the spatial light modulator is programmable for reconfiguring the optical blocking filter to eliminate each band or channel by changing a switching algorithm that drives the array of micro-mirrors.

31. An optical blocking filter according to claim 30, wherein the spatial light modulator is selectively reconfigurable by statically or dynamically modifying the switching algorithm to accommodate different channel spacing, the shape of the light beam, or the center wavelength of the light beam of the optical signal.

32. An optical blocking filter according to claim 30, wherein the switching algorithm is based on the wavelength of the optical signal and the one or more optical bands or channels being eliminated.

33. An optical blocking filter according to claim 30, wherein the spatial light modulator is configured so one group of optical channels is spaced at 100 Hz and another group of optical channels is spaced at 50 Hz.

34. An optical blocking filter according to claim 1, wherein the array of micro-mirrors includes a multiplicity of micro-mirrors that are separately controllable for tilting on an axis depending on a control signal in accordance with a switching algorithm.

35. An optical blocking filter according to claim 1, wherein the optical signal is a wavelength division multiplexed (WDM) optical signal having a plurality of wavelengths and a corresponding plurality of optical bands or channels.

36. An optical blocking filter according to claim 1, wherein each micro-mirror is tiltable in either a first position or a second position along an axis either substantially parallel to the spectral axis of the optical signal, parallel to the spatial axis of the optical signal, or at an angle of 45 degrees in relation to the spatial axis.

37. An optical blocking filter according to claim 1, wherein the one or more optical bands or channels have a desired cross-sectional geometry, including an elliptical, a rectangular, a square or a polygonal shape.

38. An optical blocking filter according to claim 1, wherein the optical arrangement includes a first free optics arrangement that provides the optical signal to the spatial light modulator, and a second free optics arrangement that provides an eliminated optical signal from the spatial light modulator.

39. An optical blocking filter according to claim 38, wherein the common free optics arrangement includes a first optical circulator for providing a first optical signal to the first optical blocking filter and for providing a first optical output signal with first remaining optical bands or channels; and a second optical circulator for providing a second optical signal to the second optical blocking filter and for providing a second optical output signal with second remaining optical bands or channels.

40. An optical blocking filter according to claim 1, wherein the optical blocking filter includes a first optical blocking filter and a second optical blocking filter, each sharing a common free optics arrangement.

41. An optical blocking filter according to claim 1, wherein the optical arrangement comprises:

one or more polarization separators for separating the optical signal into a P state optical signal and an S state optical signal, and for combining a P state optical return signal and an S state optical return signal into an optical output signal; and a ½· wave plate for rotating the P state optical signal into a rotated S state optical signal, and for rotating an S state optical return signal into the P state optical return signal.

42. An optical blocking filter according to claim 41, wherein the one or more polarization separators include a Wollistan prism, a polarization beam splitter, a fiber coupler or some combination thereof.

43. An optical blocking filter according to claim 1, wherein the optical arrangement is arranged in relation to an optical axis and the micromirror surfaces when the array of micromirrors is the neutral position are non-orthogonal in relation to the optical axis.

44. An optical blocking filter according to claim 1, wherein the optical arrangement is arranged on an optical axis and the micromirror surfaces when the array of micromirrors is in the neutral position are orthogonal to the optical axis so during a failure of the spatial light modulator the optical signal is reflected back along the optical return path and propagated through the optical blocking filter.

45. An optical blocking filter according to claim 1, wherein the optical signal includes a plurality of channels, each having at least one respective spectral band or section.

46. An optical blocking filter according to claim 1, wherein the optical signal includes at least one channel having respective spectral bands or sections arranged in non-uniform spectral arrays on the array of micro-mirror.

47. An optical blocking filter according to claim 46, wherein the non-uniform spectral arrays include arrays having a different length, width, number or combination thereof on the array of micro-mirrors.

48. An optical blocking filter according to claim 1, wherein the optical signal includes a plurality of channels that are non-linearly disposed on the array of micro-mirrors.

49. An optical blocking filter for receiving an optical signal having one or more optical bands or channels, characterized in that the optical blocking filter comprises a spatial light modulator having a micro-mirror device with an array of micro-mirrors for selectively deflecting the one or more optical bands or channels to a reflecting device, which re-reflects the one or more optical bands or channels back to the spatial light modulator for re-deflecting the one or more optical bands or channels, in order to eliminate a selected band or channel or a specified selection of bands or channels from the optical signal provided along an optical return path, wherein scattered light from a dropped signal is directed onto the micromirror device to reflect away from the return path.

50. An optical blocking filter according to claim 49, wherein the reflecting device is a mirror.

51. An optical blocking filter according to claim 49, wherein each optical band or channel is reflected off a respective plurality of micro-mirrors.

\* \* \* \* \*